(12) United States Patent
Keshavamurthy

(10) Patent No.: US 10,750,374 B1
(45) Date of Patent: Aug. 18, 2020

(54) MANAGING REGIONALIZED VEHICULAR COMMUNICATION

(71) Applicant: Toyota Jidosha Kabushiki Kaisha, Toyota-shi, Aichi-ken (JP)

(72) Inventor: Shalini Keshavamurthy, Sunnyvale, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 16/283,717

(22) Filed: Feb. 22, 2019

(51) Int. Cl.
*H04W 16/24* (2009.01)
*H04W 4/44* (2018.01)
*H04L 12/24* (2006.01)

(52) U.S. Cl.
CPC .............. *H04W 16/24* (2013.01); *H04L 41/12* (2013.01); *H04W 4/44* (2018.02)

(58) Field of Classification Search
CPC ......... H04W 4/04; H04W 4/046; H04W 4/44; H04W 16/04; H04W 16/24; H04L 41/12
See application file for complete search history.

(56) References Cited

U.S. PATENT DOCUMENTS

| 2013/0273934 | A1* | 10/2013 | Meredith | H04W 16/04 455/456.1 |
| 2015/0017995 | A1* | 1/2015 | Wirola | H04W 4/02 455/446 |
| 2015/0046591 | A1 | 2/2015 | Zhu et al. | |
| 2015/0358401 | A1 | 12/2015 | Flavel et al. | |
| 2016/0066236 | A1* | 3/2016 | Comstock | H04W 52/0254 370/331 |

* cited by examiner

*Primary Examiner* — Paul H Masur
(74) *Attorney, Agent, or Firm* — Patent Law Works LLP

(57) ABSTRACT

A method determines a topology modification for a geographical area; determines a set of coverage region(s) in the geographical area that are adjacent to a target coverage region, the target coverage region being associated with a first regionalized server configured to communicate with vehicular traffic in the target coverage region, the set of coverage region(s) being respectively associated with a set of second regionalized server(s), each second regionalized server being configured to communicate with vehicular traffic in a corresponding coverage region of the set of coverage region(s); determines that a region count of the set of coverage region(s) satisfies a region count threshold; responsive to determining that the region count of the set of coverage region(s) satisfies the region count threshold, determines a morphing portion for each coverage region in the set of coverage region(s); and morphs the set of coverage region(s) based on the corresponding morphing portions.

33 Claims, 10 Drawing Sheets

600

MANAGING REGIONALIZED VEHICULAR COMMUNICATION

BACKGROUND

The present disclosure relates to server management. In a more particular example, the disclosure relates managing regionalized vehicular communication.

Today, some modern computing systems rely on servers to provide vehicle applications to vehicles. However, in these computing systems, the areas covered by the servers usually cannot be adjusted while the traffic condition in these areas often drastically change over time. As a result, a server assigned to a particular area may not have sufficient computational resources to provide the vehicle applications to a large number of vehicles located within its coverage area in heavy traffic condition.

On the other hand, the computational resources of the server may not be efficiently utilized when the traffic in the area covered is low. In addition, as the area of the server is generally fixed, the data received from the vehicles located within the area of the area may be irrelevant or inadequate for the vehicle applications implemented on the server to accurately operate given the specific traffic condition. Furthermore, it is generally impractical or impossible for these existing solutions to flexibly provide a particular vehicle application to the vehicles located within a specific area during a certain time period, because the areas of the servers on which the vehicle application can be implemented typically remain unchanged.

SUMMARY

The subject matter described in this disclosure overcomes the deficiencies and limitations of the existing solutions by providing novel technology for efficiently managing electronic vehicular communication.

According to one innovative aspect of the subject matter described in this disclosure, a computer-implemented method comprises: determining a topology modification for a geographical area; determining a set of one or more coverage regions in the geographical area that are adjacent to a target coverage region, the target coverage region being associated with a first regionalized server configured to communicate with vehicular traffic in the target coverage region, the set of one or more coverage regions being respectively associated with a set of one or more second regionalized servers, each second regionalized server of the set of one or more second regionalized servers being configured to communicate with vehicular traffic in a corresponding coverage region of the set of one or more coverage regions; determining that a region count of the set of one or more coverage regions satisfies a region count threshold; responsive to determining that the region count of the set of one or more coverage regions satisfies the region count threshold, determining a morphing portion for each coverage region in the set of one or more coverage regions; and morphing the set of one or more coverage regions associated with the set of one or more second regionalized servers based on the corresponding morphing portions.

In general, another innovative aspect of the subject matter described in this disclosure may be embodied in computer-implemented methods comprising: detecting a traffic trigger event associated with a geographical area, the geographical area including a set of one or more coverage regions that are respectively associated with a set of one or more regionalized servers; determining a topology modification for the geographical area based on a traffic condition associated with the traffic trigger event; modifying a coverage region topology of the geographical area based on the topology modification by one or more of creating an additional coverage region for the geographical area and associating the additional coverage region with an additional regionalized server, and morphing one or more coverage regions in the set of one or more coverage regions.

In general, another innovative aspect of the subject matter described in this disclosure may be embodied in systems comprising: one or more processors; and one or more memories storing instructions that, when executed by the one or more processors, cause the system to: determine a topology modification for a geographical area; determine a set of one or more coverage regions in the geographical area that are adjacent to a target coverage region, the target coverage region being associated with a first regionalized server configured to communicate with vehicular traffic in the target coverage region, the set of one or more coverage regions being respectively associated with a set of one or more second regionalized servers, each second regionalized server of the set of one or more second regionalized servers being configured to communicate with vehicular traffic in a corresponding coverage region of the set of one or more coverage regions; determine that a region count of the set of one or more coverage regions satisfies a region count threshold; responsive to determining that the region count of the set of one or more coverage regions satisfies the region count threshold, determine a morphing portion for each coverage region in the set of one or more coverage regions; and morph the set of one or more coverage regions associated with the set of one or more second regionalized servers based on the corresponding morphing portions.

These and other implementations may each optionally include one or more of the following features: that the topology modification of the geographical area includes a creation of the target coverage region for the first regionalized server, the first regionalized server being initiated, or an expansion of a first coverage region associated with the first regionalized server to the target coverage region, and determining the morphing portion of a coverage region of the set of one or more coverage regions to include an area where the coverage region associated with a second regionalized server overlaps with the target coverage region of the first regionalized server; that morphing the set of one or more coverage regions associated with the set of one or more second regionalized servers includes reducing the coverage region associated with the second regionalized server to exclude the morphing portion corresponding to the coverage region, transmitting data associated with the morphing portion from the second regionalized server to the first regionalized server, and instructing a plurality of vehicles located within the morphing portion to communicate with the first regionalized server; that the topology modification of the geographical area includes an elimination of a first coverage region associated with the first regionalized server, the first regionalized server being removed, or a reduction of the first coverage region associated with the first regionalized server to the target coverage region, and determining the set of one or more coverage regions in the geographical area includes determining a difference region between the first coverage region associated with the first regionalized server and the target coverage region, and determining that a resource amount of the set of one or more second regionalized servers satisfies a resource amount to accommodate a plurality of vehicles located within the set of one or more coverage regions associated with the set of one or more second regionalized servers and the difference region; that determining the morphing portion for each coverage region in the set of one or more coverage regions includes determining, from the difference region, a morphing portion for a coverage region associated with a second regionalized server based on a resource amount of the second regionalized server and a traffic condition in the difference region; that morphing the set of one or more coverage regions associated with the set of one or more second regionalized servers includes expanding the coverage region associated with the second regionalized server to include the morphing portion corresponding to the coverage region, transmitting data associated with the morphing portion from the first regionalized server to the second regionalized server, and instructing a plurality of vehicles located within the morphing portion to communicate with the second regionalized server; that determining that the region count of the set of one or more coverage regions does not satisfy the region count threshold, responsive to determining that the region count of the set of one or more coverage regions does not satisfy the region count threshold, determining, from the first regionalized server and the set of one or more second regionalized servers, a set of one or more third regionalized servers based on the topology modification of the geographical area, determining a set of one or more third coverage regions in the geographical area for the set of one or more third regionalized servers, and respectively assigning the set of one or more third coverage regions to the set of one or more third regionalized servers; that determining the set of one or more third coverage regions in the geographical area includes determining a third coverage region for a third regionalized server based on a resource amount of the third regionalized server and a traffic condition in the third coverage region; that classifying the first regionalized server and the set of one or more second regionalized servers into one or more physical regionalized servers and one or more virtual regionalized servers, initiating one or more temporary virtual regionalized servers corresponding to the one or more physical regionalized servers, transmitting data associated with each physical regionalized server to a temporary virtual regionalized server corresponding to the physical regionalized server, and responsive to respectively assigning the set of one or more third coverage regions to the set of one or more third regionalized servers, transmitting, from the one or more virtual regionalized servers and the one or more temporary virtual regionalized servers, data associated with each third coverage region to a third regionalized server associated with the third coverage region; that responsive to transmitting the data associated with each third coverage region to the third regionalized server associated with the third coverage region, instructing a plurality of vehicles located within the third coverage region associated with the third regionalized server to communicate with the third regionalized server, and removing the one or more temporary virtual regionalized servers; that the topology modification of the geographical area is associated with a trigger event, the trigger event including one or more of a change of roadway condition, a change of traffic condition, and a change of traffic condition reflected in a traffic pattern of a road segment in the geographical area, an implementation of a vehicle application that is temporarily accessible in an application accessible area within the geographical area, and an unavailability of a regionalized server associated with a coverage region in the geographical area; that determining the topology modification for the geographical area includes determining a road segment in the geographical area that has a vehicle density of the road segment satisfying a vehicle density threshold, and determining the target coverage region for the first regionalized server based on the road segment; that determining the topology modification for the geographical area includes determining an application accessible area for a vehicle application temporarily implemented on the first regionalized server, and determining the target coverage region for the first regionalized server based on the application accessible area of the vehicle application; that determining the topology modification for the geographical area includes estimating a number of vehicles that are accommodatable by the first regionalized server based on a resource amount of the first regionalized server and operation requirements of a vehicle application, determining a vehicle density of a road segment that includes a first coverage region associated with the first regionalized server, and determining the target coverage region for the first regionalized server based on the number of vehicles that are accommodatable by the first regionalized server and the vehicle density of the road segment.

These and other implementations may each optionally include one or more of the following features: that the traffic trigger event includes one or more of a change of roadway condition, a change of traffic condition, and a change of traffic condition reflected in a traffic pattern of a road segment in the geographical area, and the traffic condition associated with the traffic trigger event includes one or more of a vehicle density, a traffic flow rate, an average vehicle speed, an average following distance associated with the road segment; that determining the topology modification for the geographical area includes determining a target coverage region in the geographical area for a first regionalized server based on the traffic condition associated with the traffic trigger event, and modifying the coverage region topology of the geographical area based on the topology modification includes modifying the coverage region topology by one or more of creating the target coverage region in the geographical area and associating the target coverage region with the first regionalized server, the first regionalized server being initiated, morphing a first coverage region associated with the first regionalized server into the target coverage region, and eliminating the first coverage region associated with the first regionalized server, the first regionalized server being removed; that determining, from the set of one or more coverage regions associated with the set of one or more regionalized servers, a set of one or more second coverage regions that are adjacent to the target coverage region of the first regionalized server, the set of one or more second coverage regions being respectively associated with a set of one or more second regionalized servers, and morphing the set of one or more second coverage regions associated with the set of one or more second regionalized servers based on the target coverage region of the first regionalized server; that determining the target coverage region in the geographical area for the first regionalized server based on the traffic condition associated with the traffic trigger event includes one or more of determining the target coverage region for the first regionalized server based on a road segment in the geographical area that has a vehicle density of the road segment satisfying a vehicle density threshold, and determining the target coverage region for the first regionalized server based on a number of vehicles that are accommodatable by the first regionalized server and a vehicle density of a road segment that includes a first coverage region associated with the first regionalized server.

Other implementations of one or more of these and other aspects include corresponding systems, apparatus, and computer programs, configured to perform the actions of methods, encoded on non-transitory computer storage devices.

The novel technology for managing coverage regions of regionalized servers presented in this disclosure is particularly advantageous in a number of respects. For example, the technology described herein is capable of dynamically morphing or re-establishing the coverage regions of the regionalized servers based on the traffic condition in the coverage regions. Thus, as the traffic condition changes over time, the coverage regions associated with the regionalized servers may be dynamically adjusted and/or redefined so that the regionalized servers may have sufficient computational resources to provide vehicle applications to the vehicles located within their corresponding coverage regions. As a result, the efficiency in utilizing the computational resources of the regionalized servers can be significantly improved. As a further example, the present technology is capable of morphing or re-establishing the coverage area of the regionalized server based on the traffic condition so that the data received from multiple vehicles located within the coverage region may be relevant and/or adequate to facilitate the operation of the vehicle applications implemented on the regionalized server, thereby improving the accuracy and efficiency of these vehicle applications. In addition, the technology described herein can morph or re-establish the coverage regions of the regionalized servers to dynamically and temporarily allocate a specific region to a particular regionalized server during a certain time period. Therefore, the present technology can flexibly implement one or more vehicle applications on the particular regionalized server during this time period, and thus these vehicle applications can be provided to the vehicles located within the specific region associated with the particular regionalized server on a temporary basis as needed.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

Figure 1:
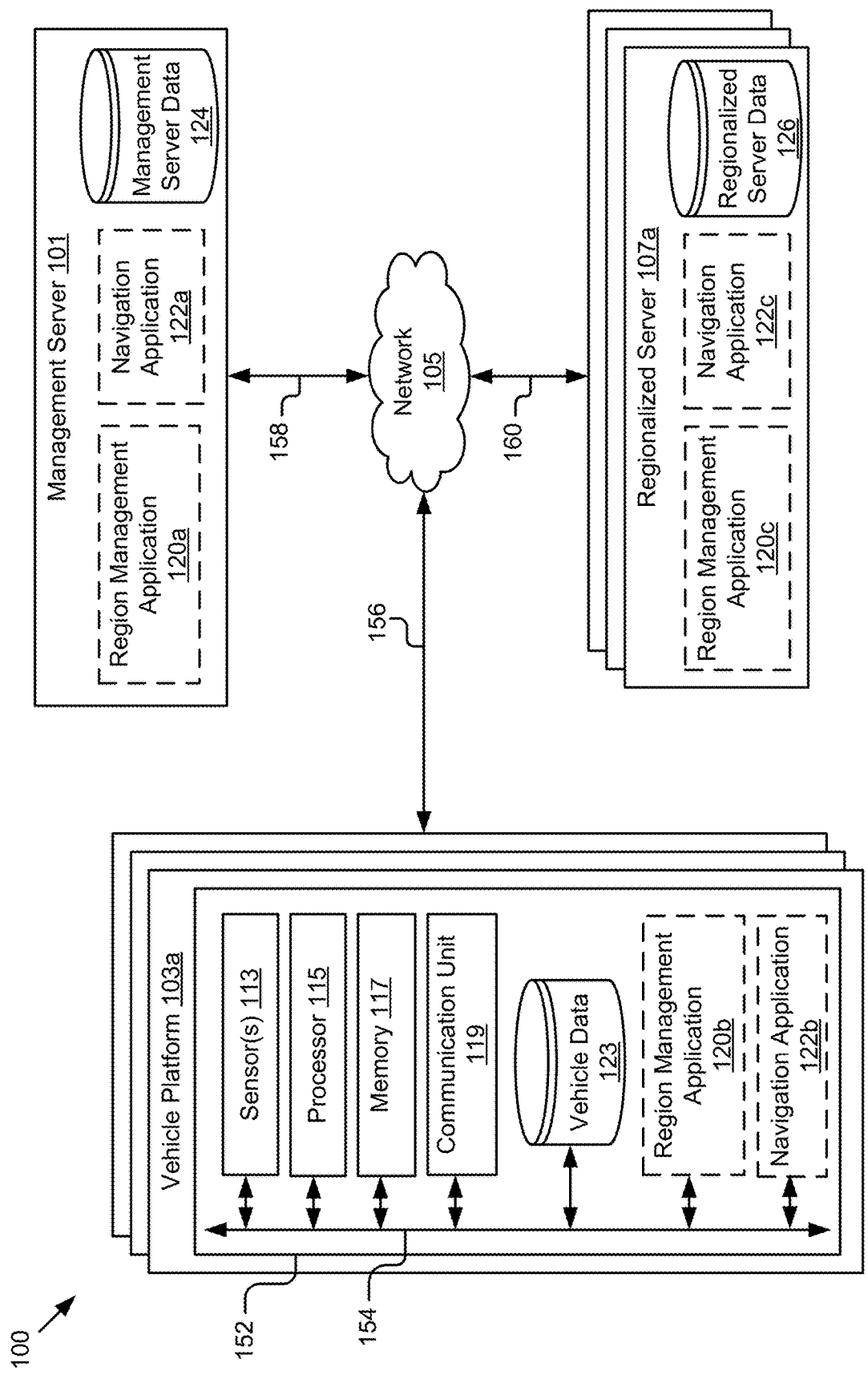
FIG. 1 is a block diagram of an example system for managing regionalized vehicular communication.

The technology described herein can effectively manage electronic data received from vehicles in different traffic regions. As described in further detail below, the technology includes various aspects, such as region management methods, systems, computing devices, computer program products, and apparatuses, among other aspects.

As described in the Background, it is challenging for a central cloud server to manage data communication for vehicular networks in a large geographical area. The technology described herein advantageously addresses this issue with a hierarchical server architecture. The architecture may include a central server (which may comprise one or more centralized or distributed physical and/or virtual server(s)) and regionalized servers. The term central may, in some embodiments, refer to server(s) that manages, coordinates and/or instructs other network nodes, such as regionalized server(s), communication-enabled mobility platforms, etc., based on rules, logic, data being received, data that is needed, etc.

A regionalized server may locally serve the vehicles in smaller regions of the geographical area, thereby improving the vehicle-server communication. For example, the regionalized server may provide vehicle applications to the vehicles located within its corresponding region. However, while a central server often has a massive amount of computational resources (e.g., commensurate with a larger server farm, large data center, etc.) and is generally always available, the regionalized server often has a comparatively limited amount of computational resources and may not always be available. Therefore, in order to flexibly provide vehicle applications to the vehicles in various regions of the geographical area, these regions may need to be managed to efficiently be served by the regionalized servers or the central server.

The technology described herein is advantageously capable of dynamically changing the coverage regions covered by the regionalized servers based on the application requirements the available computational resources of the regionalized servers and the central server, the vehicle-server connections, etc. The changes in the coverage regions of the regionalized servers may be triggered by the resource availability of the regionalized servers, the application requirements of the vehicle application, the implementation of new vehicle applications, the traffic density, the road conditions, etc.

In some embodiments, a central server may optimize the coverage regions of the regionalized servers based on their availability and resource capacity. The central server may instantiate new virtual regionalized servers if needed. The central server may then further adjust or redefine the coverage regions of the regionalized servers based on various factors, e.g., the traffic history, the road types, the traffic density, etc. The new coverage regions being formed may then be communicated to the regionalized servers and the vehicles to adapt their server-vehicle communication accordingly.

An example region management system may determine a topology modification for a geographical area. The topology modification may reflect a target coverage region to be covered by a first regionalized server. As the target coverage region is covered by a first regionalized server, the first regionalized server can communicate with the vehicular traffic in the target coverage region. In some embodiments, the region management system may morph a first coverage region associated with the first regionalized server into the target coverage region of the first regionalized server.

In some embodiments, the region management system may determine a set of second coverage regions in the geographical area that are adjacent to the target coverage region of the first regionalized server. The set of second coverage regions may be respectively associated with a set of second regionalized servers, and thus each second regionalized server may communicate with the vehicular traffic in its corresponding second coverage region. The region management system may determine whether a region count of the set of second coverage regions satisfies a region count threshold. If the region count of the set of second coverage regions satisfies the region count threshold, the region management system may determine a morphing portion for each second coverage region in the set of second coverage regions, and morph the set of second coverage regions associated with the set of second regionalized servers based on the corresponding morphing portions. If the region count of the set of second coverage regions does not satisfy the region count threshold, the region management system may determine a set of third regionalized servers based on the topology modification of the geographical area, determine a set of third coverage regions in the geographical area for the set of third regionalized servers, and respectively assign the set of third coverage regions to the set of third regionalized servers.

FIG. 1 is a block diagram of an example system 100 for managing coverage regions of regionalized servers. As shown, the system 100 includes a management server 101, one or more vehicle platforms 103a . . . 103n, and one or more regionalized servers 107a . . . 107n. The management server 101, the one or more vehicle platforms 103a . . . 103n, and the one or more regionalized servers 107a . . . 107n may be coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, regionalized servers 107, networks 105, or management servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the management server 101, the vehicle platform(s) 103, and the regionalized server(s) 107, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 123, a region management application 120, and a navigation application 122. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be coupled to the network 105 via signal line 156, and may send and receive data to and from other vehicle platform(s) 103, the regionalized server(s) 107, and/or the management server(s) 101. In some embodiments, the vehicle platform(s) 103 may be temporarily coupled to one or more of the regionalized servers 107 as the vehicle platform(s) 103 travel along the roads. For example, the vehicle platform 103 may send and receive data to and from the regionalized server(s) 107 as the vehicle platform 103 is located within the coverage region that is managed by the regionalized server(s) 107, and thus the regionalized server(s) 107 may provide one or more vehicle applications implemented on the regionalized server(s) 107 to the vehicle platform 103. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the vehicle data store 123 for access and/or retrieval by the region management application 120, the navigation application 122, and/or other vehicle applications. In some implementations, the processor(s) 115 may be capable of generating and providing electronic display signals to the input/output device(s), capturing and transmitting images, performing complex tasks including various types of data analysis and coverage region management, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or the vehicle data store 123.

The region management application 120 is computer logic executable to manage coverage regions of regionalized servers. As illustrated in FIG. 1, the management server 101 may include the instance 120*a*, the vehicle platform 103*a* . . . 103*n* may include the instances 120*b* . . . 120*m*, and the regionalized servers 107*a* . . . 107*n* may include the instances 120*c* . . . 120*n* of the region management application 120. In some embodiments, each instance 120*a*, 120*b* . . . 120*m*, and 120*c* . . . 120*n* may comprise one or more components the region management application 120 depicted in FIG. 2, and may be configured to fully or partially perform the functionalities described herein depending on where the instance resides. In some embodiments, the region management application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The region management application 120 may receive and process the vehicle data, the server data, etc., and may communicate with other elements of the vehicle platform 103 via the bus 154, such as the memory 117, the communication unit 119, the vehicle data store 123, etc. The region management application 120 is described in details below with reference to at least FIGS. 2-8C.

The navigation application 122 is computer logic executable to provide navigational guidance to the user of the vehicle platform 103. As illustrated in FIG. 1, the management server 101 may include the instance 122*a*, the vehicle platform 103*a* . . . 103*n* may include the instances 122*b* . . . 122*m*, and the regionalized servers 107*a* . . . 107*n* may include the instances 122*c* . . . 122*n* of the navigation application 122. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the navigation application 122 may determine one or more vehicle routes to a destination, generate navigation instructions corresponding to each vehicle route, and provide the navigation instructions of the vehicle route selected or followed by the user via the input/output device of the vehicle platform 103. In some embodiments, the navigation application 122 may perform path planning to determine one or more driving maneuvers for the user of the vehicle platform 103 to follow the vehicle route, and provide driving instructions describing the driving maneuvers via the input/output device of the vehicle platform 103.

In some embodiments, the navigation application 122 may analyze the data received from multiple vehicle platforms 103 to determine driving context, and determine optimal vehicle route and/or optimal driving maneuvers for the vehicle platform 103 accordingly. Thus, as the coverage regions of the regionalized servers 107 are efficiently managed by the region management application 120, the navigation application 122 can collect sufficient relevant data from the vehicle platforms 103 located within a coverage region of a regionalized server 107, and thus the accuracy of its operation can be significantly improved. It should be understood that in addition to the navigation application 122, the vehicle platforms 103, the regionalized servers 107, and/or the management server 101 may also implement other vehicle applications that rely on the data collected from the vehicle platforms 103 located within a coverage region of a regionalized server 107 to perform their operations (e.g., vehicle sharing application, road scene modeling application, etc.) in which the coverage regions of the regionalized servers 107 are managed by the region management application 120.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the region management application 120 and/or the navigation application 122. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other vehicle platform(s) 103, management server(s) 101, and/or regionalized server(s) 107 associated with the coverage region in which the vehicle platform 103 is located, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors and/or image sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geolocation sensors (e.g., Global Positioning System (GPS) sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

The vehicle data store 123 includes a non-transitory storage medium that stores various types of data. For example, the vehicle data store 123 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., the vehicle speed, the vehicle acceleration/deceleration rate, the wheel speed (Revolutions Per Minute—RPM), the steering angle, the braking force, etc. In some embodiments, the vehicle data may also include the vehicle location (e.g., GPS coordinates) indicating the geographic location of the vehicle platform 103, the moving direction of the vehicle platform 103, the vehicle route currently followed by the vehicle platform 103 to get to a destination, etc.

In some embodiments, the vehicle data store 123 may store roadway data describing the roadway structure and the roadway condition of various road segments. In some embodiments, the roadway data associated with a road segment may include one or more roadway attributes of the road segment. Non-limiting examples of the roadway attributes include, but are not limited to, the roadway type (e.g., freeway, city street, etc.), the roadway geometry (e.g., the shape and size of the roadway, the road curvature, the road grade, etc.), the roadway status (e.g., road closure, road construction, etc.), the number of lanes, the lane type (e.g., carpool lane, exit lane, merging lane, etc.), the lane status (e.g., lane closure, open lane, etc.), the number of intersections, the traffic light position, the speed limit, etc., of the road segment. In some embodiments, the vehicle platform 103 may analyze the sensor data captured by the sensors 113 as the vehicle platform 103 travel along the road segment, and determine the roadway data associated with the road segment based on the sensor data. Other types of roadway data are also possible and contemplated.

In some embodiments, the vehicle data store 123 may store traffic data describing the traffic condition on various road segments. In some embodiments, the traffic data associated with a road segment may include one or more traffic attributes of the road segment. Non-limiting examples of the traffic attributes include, but are not limited to, the vehicle density indicating the number of vehicles present on a predefined distance of the road segment (e.g., 40 vehicles/km), the traffic flow rate indicating the number of vehicles passing a static point on the road segment in a predefined time period (e.g., 4000 vehicles/h), the average vehicle speed of the vehicles travelling on the road segment (e.g., 100 km/h), the average following distance between the vehicles travelling on the road segment (e.g., 15 m), etc. In some embodiments, the traffic data associated with the road segment may also include the traffic pattern describing the traffic condition on the road segment at various time of day. In some embodiments, the vehicle platform 103 may analyze the sensor data captured by the sensors 113 as the vehicle platform 103 travel along the road segment, and determine the traffic data associated with the road segment based on the sensor data. Other types of traffic data are also possible and contemplated.

In some embodiments, the vehicle data store 123 may store application data of one or more vehicle applications that are implemented on the management server 101 and/or the regionalized servers 107 and provided to the vehicle platform 103. In some embodiments, as the vehicle application is provided to the vehicle platform 103 by the management server 101 and/or by the regionalized server 107 associated with the coverage region in which the vehicle platform 103 is located, the vehicle platform 103 may send and receive the application data of the vehicle application (e.g., application request, application execution data, application response data, etc.) to and from the management server 101 and/or the regionalized server 107. In some embodiments, the vehicle platform 103 may also periodically transmit to the management server 101 and/or the regionalized server 107 other types of data associated with the vehicle platform 103 (e.g., the vehicle data, the roadway data, the traffic data, etc.).

In some embodiments, the vehicle data store 123 may store trigger data describing the trigger events that trigger the adjustment or re-establishment of the coverage regions of the regionalized servers 107. In some embodiments, the trigger events may include traffic trigger events and server trigger events. Non-limiting examples of the traffic trigger events include, but are not limited to, a change of roadway condition, a change of traffic condition, a change of traffic condition reflected in the traffic pattern of the road segment, etc. Non-limiting examples of the server trigger events include, but are not limited to, an implementation of a vehicle application to be temporarily accessible within an application accessible area, a regionalized server associated with a coverage region becomes unavailable, etc. Other types of trigger events are also possible and contemplated.

In some embodiments, the vehicle data store 123 may store one or more coverage region topologies of one or more geographical areas. The coverage region topology of each geographical area may describe one or more coverage regions in the geographical area, and specify the regionalized server(s) 107 associated with each coverage region. In some embodiments, for each coverage region in the geographical area, the coverage region topology may indicate the region shape (e.g., ellipse, circle, rectangular, etc.), the region size (e.g., ellipse axes, circle diameter, rectangular dimensions, etc.), the region location (e.g., GPS coordinates), etc., of the coverage region. In some embodiments, the coverage region topology of the geographical area may be updated as the coverage regions of the regionalized servers 107 in the geographical area are adjusted and/or redefined.

In some embodiments, the vehicle data store 123 may be part of a data storage system (e.g., a standard data or database management system) for storing and providing access to data. Other types of data stored in the vehicle data store 123 are also possible and contemplated.

The regionalized server 107 includes a hardware and/or virtual server that includes a processor, a memory, and network communication capabilities (e.g., a communication unit). As depicted, the regionalized server 107 may be communicatively coupled to the vehicle platforms 103 located within its coverage region, the management server 101, and/or other entities of the system 100 via the network 105 as reflected by signal line 160. In some embodiments, the regionalized server 107 may be a physical regionalized server 107. The physical regionalized server 107 may be implemented in a computing infrastructure (e.g., a roadside unit, a telco node, etc.) as a stationary regionalized server 107, or implemented in a vehicle platform 103 as a movable regionalized server 107. In some embodiments, the regionalized server 107 may be a virtual regionalized server 107. The virtual regionalized server 107 may reside in one or more physical regionalized servers 107, the management server 101, and/or any physical computing entity(ies) of the system 100.

In some embodiments, the regionalized server 107 may be associated with a coverage region within a geographical area. Thus, the coverage region may be covered by the regionalized server 107, and the regionalized server 107 may communicate with vehicular traffic in this coverage region. As the regionalized server 107 may communicate with the vehicular traffic in this coverage region, the regionalized server 107 may send and receive data to and from the vehicle platforms 103 located within the coverage region, and thus the regionalized server 107 can provide the vehicle applications implemented on the regionalized server 107 to these vehicle platforms 103. In some embodiments, the physical regionalized servers 107 and/or the physical computing entities on which the virtual regionalized servers 107 reside may be located at a lower distance from the geographical areas as compared to the management server 101. This implementation is advantageous because the communication delay between the vehicle platforms 103 located in the geographical areas and these regionalized servers 107 can be reduced.

In some embodiments, the regionalized server 107 may be associated with multiple coverage regions, these coverage regions may be in the same geographical area or in different geographical areas. As an example, a physical regionalized server 107 may be associated with a first coverage region, and may host a virtual regionalized server 107 associated with a second coverage region. Thus, the physical regionalized server 107 may be considered as being associated with the first coverage region and the second coverage region. As another example, a regionalized server 107 may implement a vehicle application that does not rely on the traffic data to operate. Therefore, the regionalized server 107 may be associated with multiple coverage regions to provide the vehicle application to the vehicle platforms 103 located within these coverage regions, even if the traffic in these coverage regions may not be relevant or may not impact one another.

In some embodiments, a coverage region in the geographical area may be associated with multiple regionalized server 107. As an example, multiple vehicle platforms 103 located within the coverage region at a particular timestamp may perform the functionalities of multiple movable regionalized server 107. These movable regionalized server 107 may collaboratively cover the coverage region, and provide the vehicle applications implemented on these movable regionalized server 107 to the vehicle platforms 103 located within the coverage region at the particular timestamp. In this present disclosure, the region management method and system may be described with the embodiments in which one coverage region is associated with one regionalized server 107 to simplify the description. However, it should be understood that one coverage region may be associated with one or more regionalized servers 107, and one regionalized server 107 may be associated with one or more coverage regions as discussed above. The coverage region(s) associated with a regionalized server 107 may be referred to herein as the coverage region(s) of the regionalized server 107.

As depicted in FIG. 1, the regionalized server 107 may include an instance 120c of the region management application 120, an instance 122b of the navigation application 122 and a regionalized server data store 126 that stores various types of data for access and/or retrieval by these applications. In some embodiments, the regionalized server data store 126 includes a non-transitory storage medium that stores application data of one or more vehicle applications implemented on the regionalized server 107, and the regionalized server 107 may provide these vehicle applications to the vehicle platforms 103 located within its coverage region. Non-limiting examples of the application data of the vehicle application include, but are not limited to, executable file, data file, input data, output data, data format, data size, average execution time, etc., of the vehicle application. In some embodiments, the application data may also include the operation requirement describing the requirements to execute an application request associated with the vehicle application. In some embodiments, the operation requirement of the vehicle application may specify the resource amount required to execute the application request (e.g., the amount of computing resource, the amount of data storage resource, the amount of memory resource, the amount of communication resource, etc.). The operation requirement of the vehicle application may also specify the server configuration required to implement the vehicle application (e.g., Central Processing Unit (CPU), Graphic Processing Unit (GPU), etc.). Other types of application data of the vehicle application are also possible and contemplated.

In some embodiments, the regionalized server data store 126 may store server operation data of the regionalized server 107. The server operation data may include one or more server parameters describing the server operation of the regionalized server 107, the server resource data describing the computational resources of the regionalized server 107, etc. In some embodiments, the server resource data may indicate the total resource amount of the regionalized server 107 and the available resource amount of the regionalized server 107 at multiple timestamps. For each timestamp, the available resource amount may indicate the amount of available computing resource (e.g., number of available CPU cycles), the amount of available data storage resource (e.g., capacity of free storage space), the amount of available memory resource (e.g., capacity of free memory space), the amount of available communication resource (e.g., unoccupied communication bandwidth), etc., of the regionalized server 107 at the timestamp.

In some embodiments, the regionalized server data store 126 may store various types of data received from the vehicle platforms 103. In some embodiments, the regionalized server 107 may receive the vehicle data, the roadway data, the traffic data, the application data, etc., from multiple vehicle platforms 103 located within its coverage region, and store the received data in the regionalized server data store 126. As discussed elsewhere herein, the vehicle applications implemented on the regionalized server 107 (e.g., the navigation application 122, etc.) may use the data received from multiple vehicle platforms 103 located within the coverage region of the regionalized server 107 to execute the application requests for these vehicle platforms 103, thereby improving the accuracy and efficiency of these vehicle applications. In some embodiments, the regionalized server 107 may transmit the data received from multiple vehicle platforms 103 located within its coverage region to the management server 101. The data received from a vehicle platform 103 may be referred to herein as the data associated with the vehicle platform 103.

In some embodiments, the regionalized server data store 126 may store the roadway data describing the roadway structure and the roadway condition of various road segments in the coverage region of the regionalized server 107. In some embodiments, the regionalized server 107 may analyze the data associated with the vehicle platforms 103 located within its coverage region, and extract or determine the roadway data of these road segments based on the data associated with these vehicle platforms 103. In some embodiments, the regionalized server 107 may receive the roadway data of the road segments in its coverage region from the management server 101 and/or a third-party server (e.g., Transportation Department).

In some embodiments, the regionalized server data store 126 may store the traffic data describing the traffic condition of various road segments in the coverage region of the regionalized server 107. In some embodiments, the regionalized server 107 may analyze the data associated with the vehicle platforms 103 located within its coverage region, and extract or determine the traffic data of these road segments based on the data associated with these vehicle platforms 103. The regionalized server 107 may also analyze the data associated with the vehicle platforms 103, and determine the traffic pattern of these road segments at various time of day. In some embodiments, the regionalized server 107 may receive the traffic data and/or the traffic pattern of the road segments in its coverage region from the management server 101.

In some embodiments, the regionalized server data store 126 may store the trigger data describing the trigger events that trigger the adjustment or re-establishment of the coverage regions of the regionalized servers 107. As discussed elsewhere herein, the trigger events may include the traffic trigger events and the server trigger events. In some embodiments, the regionalized server data store 126 may also store the coverage region topology of the geographical area that includes the coverage region of the regionalized server 107. As discussed elsewhere herein, the coverage region topology of the geographical area may describe one or more coverage regions in the geographical area, and specify the regionalized server(s) 107 associated with each coverage region.

The management server 101 includes a hardware and/or virtual server that includes a processor, a memory, and network communication capabilities (e.g., a communication unit). In some embodiments, the management server 101 may be a computing server located remotely from the geographical areas. For example, the management server 101 may be a cloud server residing in a data center. The management server 101 may be communicatively coupled to the network 105, as reflected by signal line 158. In some embodiments, the management server 101 may send and receive data to and from other entities of the system 100, e.g., the regionalized servers 107, the vehicle platforms 103, etc. via the network 105. As depicted, the management server 101 may include an instance 120a of the region management application 120, an instance 122a of the navigation application 122, and a management server data store 124 that stores various types of data for access and/or retrieval by these applications.

In some embodiments, the management server data store 124 includes a non-transitory storage medium that stores geographical area data associated with one or more geographical areas. In some embodiments, each geographical area may include one or more coverage regions, each coverage regions may be associated with one or more regionalized servers 107 as discussed elsewhere herein. In some embodiments, for each geographical area, the management server data store 124 may store the coverage region topology describing the coverage regions in the geographical area and specifying the regionalized server(s) 107 associated with each coverage region. The management server data store 124 may also store the server operation data describing the server operation and the computational resources of the regionalized server(s) 107 associated with each coverage region.

In some embodiments, the management server data store 124 may store data associated with multiple vehicle platforms 103. The management server 101 may receive the data associated with the vehicle platform 103 from the vehicle platform 103 and/or from the regionalized server 107 associated with the coverage region in which the vehicle platform 103 is located, and store the data associated with the vehicle platform 103 in the management server data store 124. As discussed elsewhere herein, the data associated with the vehicle platform 103 may include the vehicle data, the roadway data, the traffic data, the application data, etc., received from the vehicle platform 103.

In some embodiments, for each geographical area, the management server data store 124 may store the roadway data describing the roadway structure and the roadway condition of various road segments in the geographical area. In some embodiments, the management server 101 may analyze the data associated with the vehicle platforms 103 located within the geographical area, and extract or determine the roadway data of these road segments based on the data associated with these vehicle platforms 103. In some embodiments, the management server 101 may receive the roadway data of the road segments in the geographical area from a third-party server (e.g., Transportation Department).

In some embodiments, for each geographical area, the management server data store 124 may store the traffic data describing the traffic condition of various road segments in the geographical area. In some embodiments, the management server 101 may analyze the data associated with the vehicle platforms 103 located within the geographical area, and extract or determine the traffic data of these road segments based on the data associated with these vehicle platforms 103. The management server 101 may also analyze the data associated with the vehicle platforms 103, and determine the traffic pattern of these road segments at various time of day.

In some embodiments, the management server data store 124 may store application data of various vehicle applications implemented on the management server 101 and/or the regionalized servers 107 to provide to the vehicle platforms 103 (e.g., navigation application 122, etc.). As discussed elsewhere herein, the application data may include the operation requirement of the vehicle application. In some embodiments, the management server data store 124 may also store the trigger data describing the trigger events that trigger the adjustment or re-establishment of the coverage regions of the regionalized servers 107. As discussed elsewhere herein, the trigger events may include the traffic trigger events and the server trigger events. In some embodiments, the management server data store 124 may also store event data describing various public events in the geographical areas. In some embodiments, for each public event, the event data may include the event type (e.g., parade, sport game, etc.), the event location (e.g., Rio Tinto Stadium), the event capacity (e.g., 10,000 attendees), the event start time, the event end time, etc., of the public event. Other types of event data are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
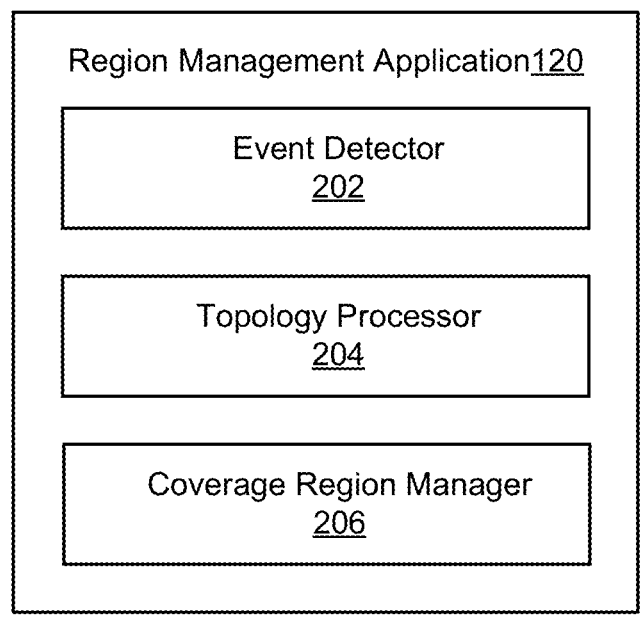
FIG. 2 is a block diagram of an example region management application.

FIG. 2 is a block diagram of an example region management application 120. As depicted, the region management application 120 may include an event detector 202, a topology processor 204, and a coverage region manager 206, although it should be understood that the region management application 120 may include additional components such as, but not limited to, a configuration engine, a training engine, an encryption/decryption engine, etc., and/or these various components may be combined into a single engine or divided into additional engines. The event detector 202, the topology processor 204, and the coverage region manager 206 may be implemented as software, hardware, or a combination of the foregoing. In some embodiments, the event detector 202, the topology processor 204, and the coverage region manager 206 may be communicatively coupled by the bus 154 and/or the processor 115 to one another and/or to the other components of the computing device 152. In some embodiments, one or more of the components 120, 202, 204, and/or 206 are sets of instructions executable by the processor 115 to provide their functionality. In further embodiments, one or more of the components 120, 202, 204, and/or 206 are storable in the memory 117 and are accessible and executable by the processor 115 to provide their functionality. In any of the foregoing embodiments, these components 120, 202, 204, and/or 206 may be adapted for cooperation and communication with the processor 115 and other components of the computing device 152. The region management application 120 and its components 202, 204, 206 are described in further detail below with reference to at least FIGS. 3-8C.

Figure 6A:
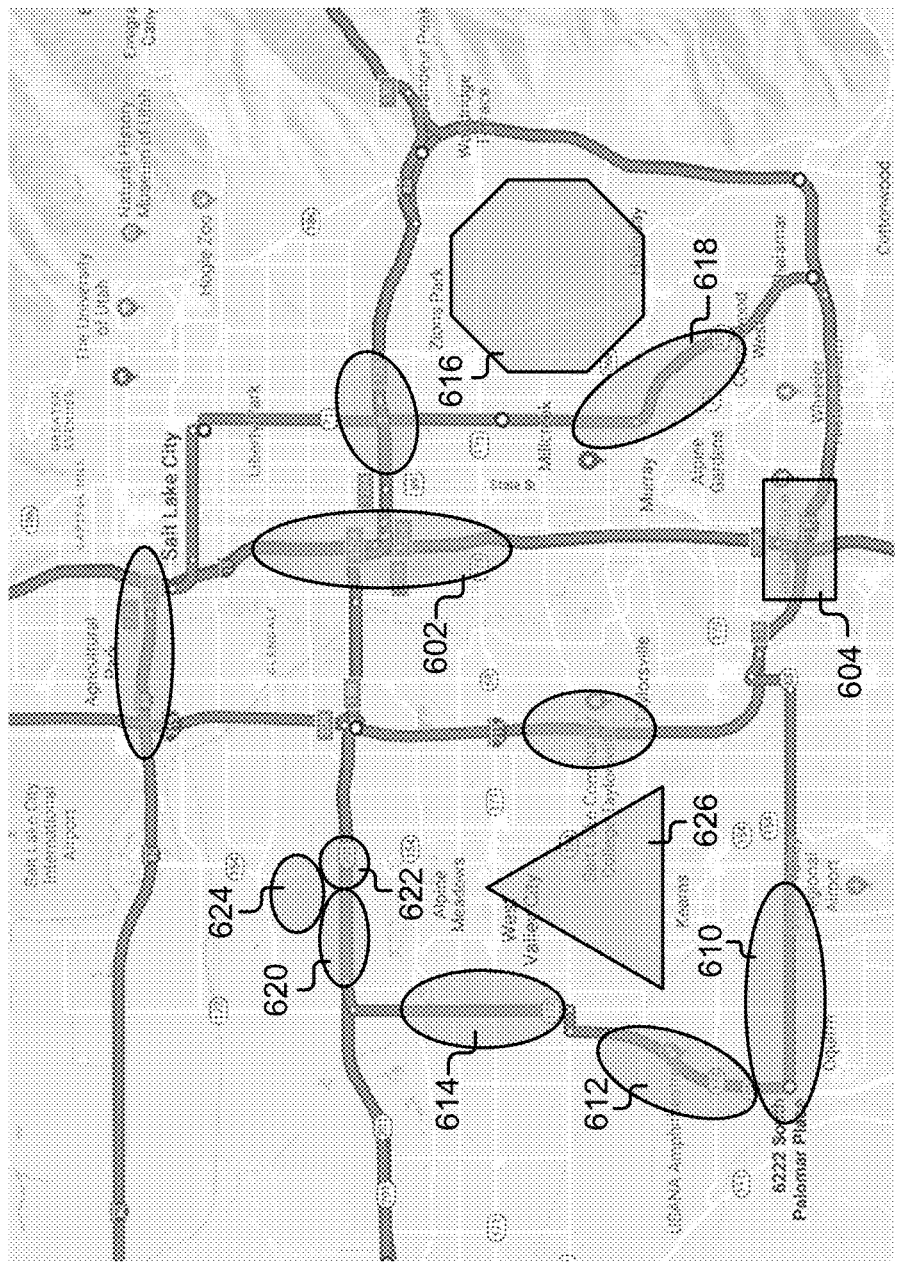
FIG. 6A illustrates an example geographical area.

As discussed elsewhere herein, the region management application 120 is computer logic executable to manage the coverage regions of regionalized servers 107 in a geographical area. An example geographical area 600 is illustrated in FIG. 6A. As depicted, the geographical area 600 may be a predefined area and may include one or more coverage regions. In some embodiments, the topology processor 204 may determine the coverage regions for the geographical area based on the roadway structure and/or the traffic pattern of various road segments in the geographical area. For example, as depicted in FIG. 6A, the topology processor 204 may create a coverage region 602 covering a portion of the freeway I-15 due to the heavy traffic on this road segment, a coverage region 604 covering an interchange between the freeway I-15 and the freeway 215, etc. As depicted, the coverage regions may be positioned across the geographical area 600 and may have different shape and size. In some embodiments, two or more coverage regions may be located adjacent to one another and may share a portion of their region boundary. In this case, these two or more coverage regions may be considered as being continuously adjacent to one another (e.g., the coverage regions 610 and 612; the coverage regions 620, 622, and 624). In some embodiments, two or more coverage regions may be located adjacent to one another but may not share any portion of their region boundary. In this case, these two or more coverage regions may be considered as being discontinuously adjacent to one another (e.g., the coverage regions 612 and 614; the coverage regions 616 and 618). As depicted in FIG. 6A, the coverage region may cover a road segment (e.g., the coverage regions 612, 614, 618, 620, 622) and/or a residential area (e.g., the coverage regions 616, 624, 626).

In some embodiments, each coverage region in the geographical area may be associated with a regionalized server 107, the regionalized server 107 associated with the coverage region may be configured to communicate with the vehicular traffic in the coverage region. For example, the regionalized server 107 may send and receive data to and from the vehicle platforms 103 located within the coverage region, and provide vehicle applications implemented on the regionalized server 107 to these vehicle platforms 103. Although the region management application 120 is described below with the embodiments in which each coverage region is associated with one regionalized server 107 to simplify the description, it should be understood that each coverage region may be associated with one or more regionalized servers 107, and each regionalized server 107 may be associated with one or more coverage regions as discussed elsewhere herein.

Figure 6D:
FIGS. 6B-6D illustrates example coverage regions.
Figure 6C:
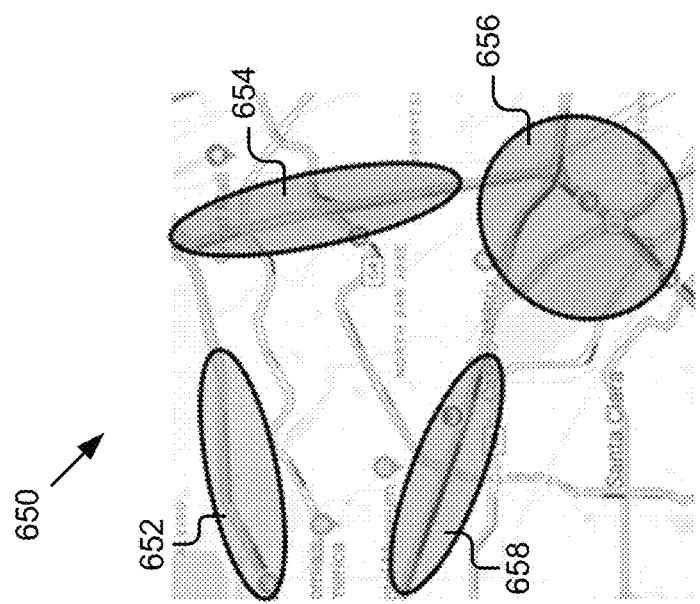
Figure 6B:

FIGS. 6B-6D illustrates other example coverage regions of other geographical areas. FIG. 6B depicts a geographical area 632 and a geographical area 634. In this example, each geographical area may include one coverage region that covers the entire geographical area, and each coverage region may be associated with one regionalized server 107. FIG. 6C depicts a geographical area 650 including the coverage regions 652, 654, 656, 658 that cover various road segments. In this example, the coverage regions 652, 654, 656, 658 may be determined based on the traffic condition of the corresponding road segment, and each coverage region may be associated with one regionalized server 107. FIG. 6D depicts a residential area 670 of a geographical area. In this example, the residential area 670 may include multiple road segments with relatively low traffic. Therefore, the residential area 670 may be covered by one coverage region, and the coverage region may be associated with one regionalized server 107.

Figure 3:
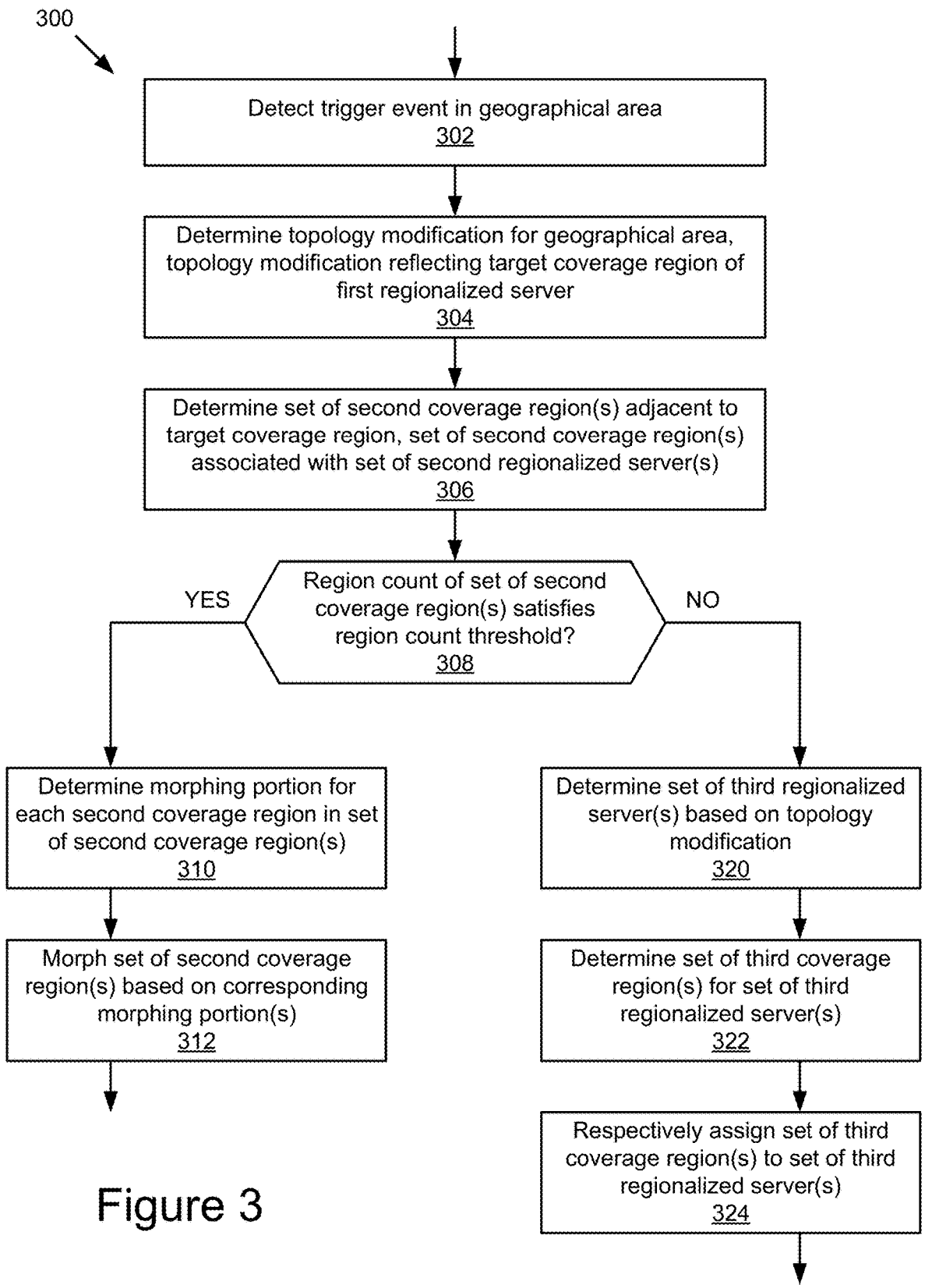
FIG. 3 is a flowchart of an example method for managing the coverage regions of the regionalized servers.

FIG. 3 is a flowchart of an example method 300 for managing the coverage regions of the regionalized servers 107 in a geographical area. In some embodiments, the geographical area may initially include a set of coverage regions that are respectively associated with a set of regionalized servers 107. In this present disclosure, a set of coverage regions may include one or more coverage regions, and a set of regionalized servers 107 may include one or more regionalized servers 107.

In block 302, the event detector 202 may detect a trigger event associated with the geographical area, the trigger event may be a traffic trigger event or a server trigger event that triggers the adjustment or the re-establishment of the coverage regions in the geographical area. In some embodiments, to detect the traffic trigger event, the event detector 202 may monitor the roadway data of various road segments in the geographical area, and detect the traffic trigger event based on the roadway data. In some embodiments, the event detector 202 may analyze the roadway data of a road segment, and determine whether the roadway attribute of the road segment has changed (e.g., the roadway status of the road segment has changed from "open road" to "road construction," the lane status of a traffic lane in the road segment has changed from "lane closure" to "open lane," etc.). If the roadway attribute of the road segment has changed, the event detector 202 may determine the traffic trigger event to be a change of roadway condition, and determine the road segment to be the road segment associated with the traffic trigger event.

In some embodiments, the event detector 202 may monitor the traffic data of various road segments in the geographical area, and detect the traffic trigger event based on the traffic data. In some embodiments, the event detector 202 may analyze the traffic data of a road segment, and determine whether the traffic attribute of the road segment has satisfied the corresponding traffic attribute threshold (e.g., the vehicle density of the road segment is higher than 180 vehicles/km, the traffic flow rate of the road segment is lower than 20 vehicles/hour, etc.). If the traffic attribute of the road segment has satisfied the corresponding traffic attribute threshold, the event detector 202 may determine the traffic trigger event to be a change of traffic condition, and determine the road segment to be the road segment associated with the traffic trigger event. In some embodiments, the event detector 202 may analyze the traffic pattern of the road segment, and determine that the traffic pattern of the road segment indicates a change of traffic condition at a particular timestamp (e.g., the vehicle density of the road segment usually increases above 150 vehicles/km at 5 pm on weekdays). Thus, at the particular timestamp, the event detector 202 may determine the traffic trigger event to be a change of traffic condition that is reflected in the traffic pattern of the road segment.

In some embodiments, the event detector 202 may analyze the traffic pattern of various the road segments in a coverage region of a regionalized server 107, and determine that the traffic pattern of these road segments indicates low traffic in the coverage region of the regionalized server 107 during a time window (e.g., the vehicle density of these road segments is usually lower than 15 vehicles/km between 1 am and 5 am). Thus, at the start timestamp of the time window, the event detector 202 may determine the traffic trigger event to be the low traffic condition in the coverage region of the regionalized server 107 during the time window. Other implementations for detecting the traffic trigger event are also possible and contemplated.

In some embodiments, to detect the server trigger event, the event detector 202 may monitor the server operation data of the regionalized servers 107 associated with various coverage regions in the geographical area, and detect the server trigger event based on the server operation data. In some embodiments, the event detector 202 may analyze the server operation data of a regionalized server 107, and determine whether the server parameter of the regionalized server 107 has satisfied the corresponding parameter threshold (e.g., the task execution time is higher than 20 ms, etc.). If the server parameter of the regionalized server 107 has satisfied the corresponding parameter threshold, the event detector 202 may determine that the regionalized server 107 has become temporarily unavailable. Thus, the event detector 202 may determine the server trigger event to be an unavailability of the regionalized server 107, and determine the coverage region of the regionalized server 107 to be the coverage region associated with the server trigger event.

In some embodiments, the event detector 202 may determine a public event based on the event data associated with the geographical area, and determine that a vehicle application is to be temporarily implemented on a regionalized server 107 due to the public event. During a time window associated with the public event, the regionalized server 107 may provide the vehicle application to the vehicle platforms 103 located within an application accessible area associated with the public event. Thus, the event detector 202 may determine the server trigger event to be a temporary implementation of the vehicle application on the regionalized server 107. As an example, to provide parking assistance for attendees of a hockey game that starts at 6 pm, the event detector 202 may determine the server trigger event to be a temporary implementation of a parking application on a regionalized server 107, the regionalized server 107 may provide the parking application to the vehicle platforms 103 located within a predefined distance from the hockey arena (e.g., 750m) during the time window between 4 pm and 7 pm. Other implementations for detecting the server trigger event are also possible and contemplated.

In block 304, the topology processor 204 may determine a topology modification for the geographical area, the topology modification may reflect a target coverage region for a first regionalized server 107. In some embodiments, the topology processor 204 may determine the first regionalized server 107 based on the trigger event, the first regionalized server 107 may be initiated, may be removed, or may have its coverage region being expanded or reduced in response to the trigger event associated with the geographical area. In some embodiments, the topology processor 204 may also determine the target coverage region to be covered by the first regionalized server 107. As the target coverage region is covered by the first regionalized server 107, the first regionalized server 107 will be able to communicate and provide vehicle applications to the vehicular traffic in the target coverage region. In some embodiments, depending on the trigger event being detected, the topology processor 204 may determine the target coverage region for the first regionalized server 107 based on the traffic condition of the road segment associated with the traffic trigger event, the resource amount of the first regionalized server 107, the operation requirement of the vehicle application implemented on the first regionalized server 107, and/or the application accessible area of the vehicle application to be temporarily implemented on the first regionalized server 107, etc.

Figure 7A:
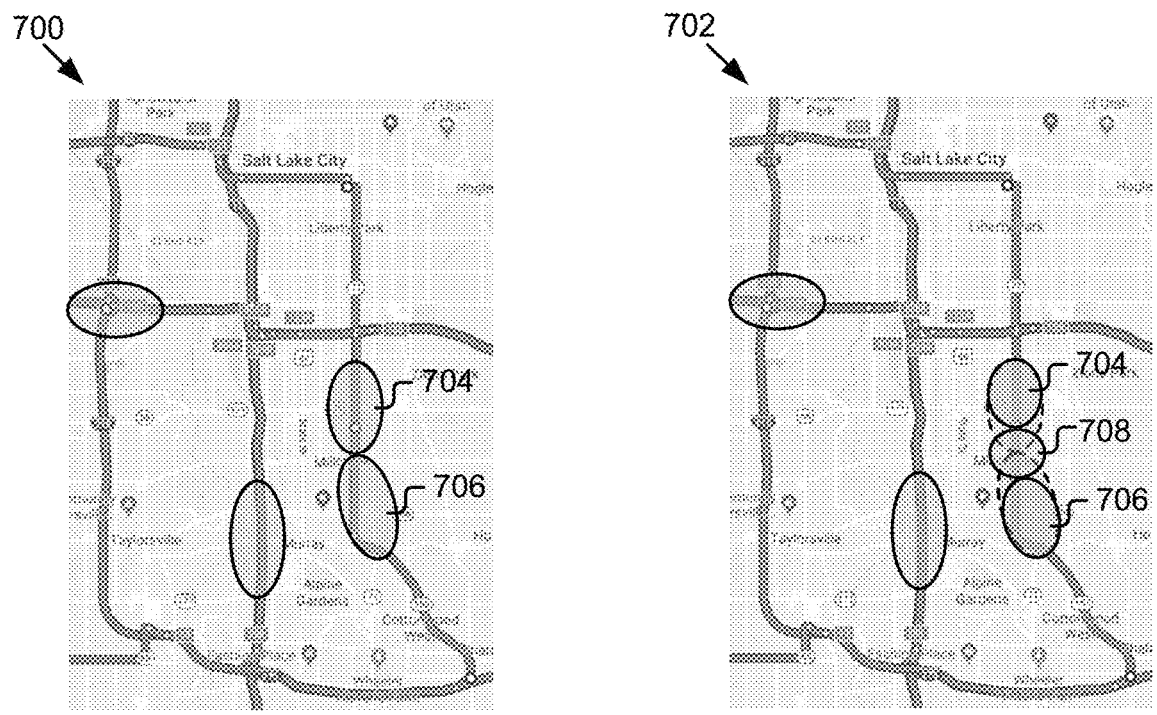
FIGS. 7A-7E illustrate examples of the coverage regions associated with the regionalized servers being morphed.
Figure 7B:
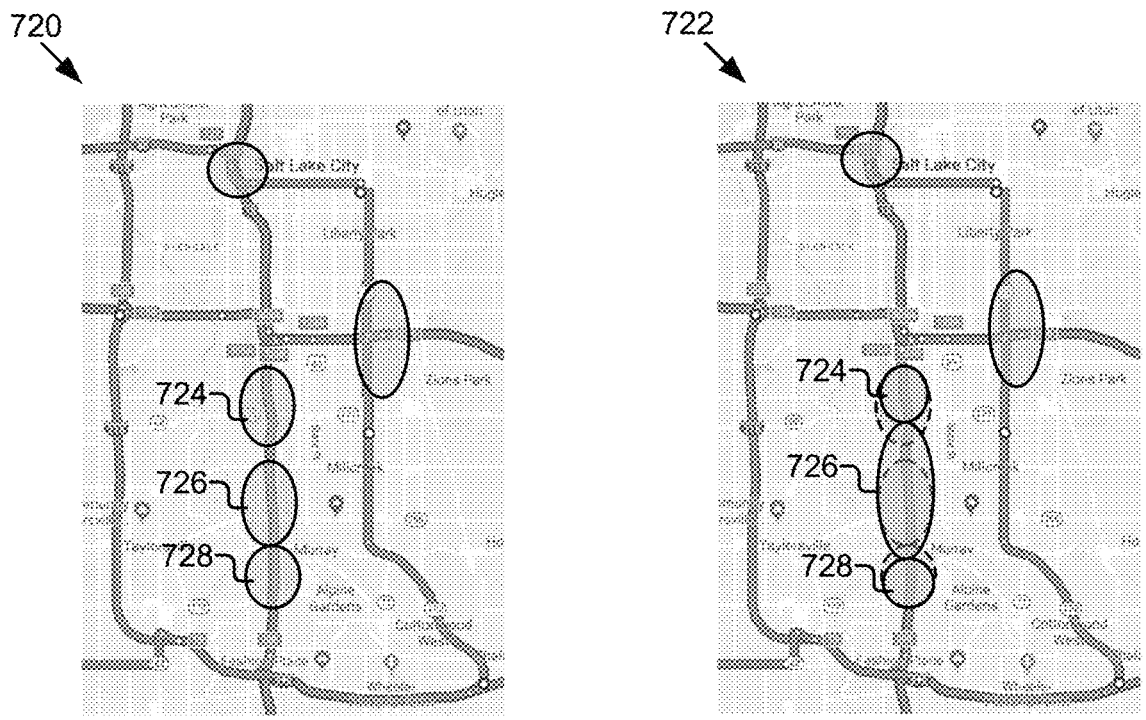
Figure 7C:
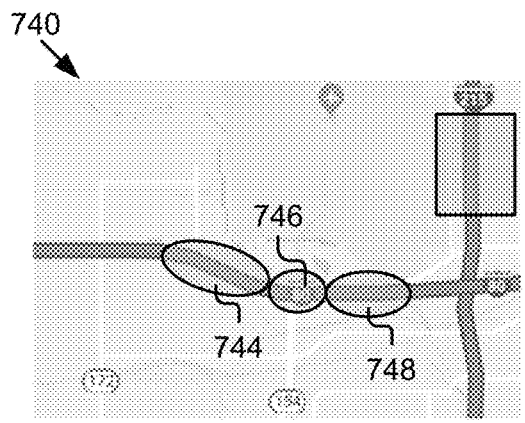
Figure 7C:
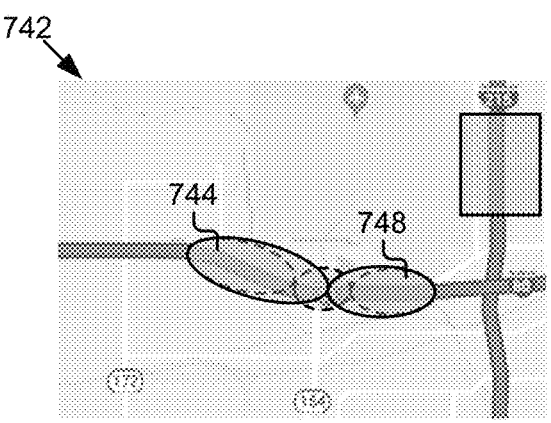

In some embodiments, if the event detector 202 detects the server trigger event in which a regionalized server 107 has become unavailable, the topology processor 204 may determine this regionalized server 107 to be the first regionalized server 107, the first regionalized server 107 may be associated with a first coverage region. As the first regionalized server 107 is no longer available, the topology processor 204 may determine the target coverage region for the first regionalized server 107 to be zero. Thus, in this situation, the topology modification of the geographical area may be the elimination of the first coverage region associated with the first regionalized server 107 as the first regionalized server 107 is removed. The first regionalized server 107 is considered being removed if the first regionalized server 107 can no longer serve the vehicular platforms 103 in its first coverage region because the first regionalized server 107 is unavailable or inactivated. As an example, FIG. 7C depicts a topology modification from the coverage region topology 740 to the coverage region topology 742, in which the coverage region 746 associated with the first regionalized server 107 is eliminated as the first regionalized server 107 is removed.

In some embodiments, if the event detector 202 detects the server trigger event in which a vehicle application is to be temporarily implemented due to a public event, the topology processor 204 may initiate a first regionalized server 107. The first regionalized server 107 may be a virtual regionalized server 107 or a physical regionalized server 107. In some embodiments, the topology processor 204 may determine the target coverage region and the required resource amount for the first regionalized server 107, and initiate the first regionalized server 107 based on the target coverage region and the required resource amount. In some embodiments, to determine the target coverage region for the first regionalized server 107, the topology processor 204 may determine the application accessible area within which the vehicle application is accessible to the vehicle platforms 103 based on the event location of the public event, and determine the target coverage region for the first regionalized server 107 to be the application accessible area of the vehicle application. In some embodiments, to determine the required resource amount for the first regionalized server 107, the topology processor 204 may estimate a number of vehicle platforms 103 located within the target coverage region based on the traffic condition of various road segments in the target coverage region (e.g., the vehicle density, the traffic flow rate, etc.). The topology processor 204 may then determine the required resource amount for the first regionalized server 107 based on the number of vehicle platforms 103 located within the target coverage region and the operation requirement of the vehicle application (e.g., the amount of various computational resources required to execute an application request). Thus, in this situation, the topology modification of the geographical area may be the creation of the target coverage region associated with the first regionalized server 107 as the first regionalized server 107 is initiated. As an example, FIG. 7A depicts a topology modification from the coverage region topology 700 to the coverage region topology 702, in which the coverage region 708 associated with the first regionalized server 107 is created as the first regionalized server 107 is newly initiated.

In some embodiments, if the event detector 202 detects the traffic trigger event in which the roadway condition and/or the traffic condition of a road segment has changed, or detects the traffic trigger event in which the change of traffic condition is reflected in the traffic pattern of the road segment, the topology processor 204 may determine the first regionalized server 107 and the target coverage region for the first regionalized server 107 based on the traffic condition associated with the traffic trigger event. In some embodiments, the traffic condition associated with the traffic trigger event may be the traffic condition of the road segment associated with the traffic trigger event, and may include one or more of the vehicle density, the traffic flow rate, the average vehicle speed, the average following distance, etc., of the road segment associated with the traffic trigger event.

In some embodiments, to determine the first regionalized server 107, the topology processor 204 may determine the regionalized server 107 that has its coverage region covering at least a portion of the road segment associated with the traffic trigger event, and determine this regionalized server 107 to be the first regionalized server 107, the first regionalized server 107 may be currently associated with a first coverage region.

In some embodiments, to determine the target coverage region for the first regionalized server 107, the topology processor 204 may determine the first road segment to be included in the target coverage region. In some embodiments, the topology processor 204 may determine from the road segment associated with the traffic trigger event the first road segment that has the vehicle density of the first road segment satisfying a vehicle density threshold (e.g., higher than 120 vehicles/km), and determine the target coverage region for the first regionalized server 107 to include the first road segment. This implementation is advantageous, because as the vehicle density of the first road segment satisfies the vehicle density threshold, the data associated with the vehicle platforms 103 located on the first road segment may likely be relevant to one another. Therefore, as the target coverage region including the first road segment is covered by the first regionalized server 107, the first regionalized server 107 can receive relevant data from multiple vehicle platforms 103 located on the first road segment, and thus the operation of the vehicle applications implemented on the first regionalized server 107 can be significantly improved.

In some embodiments, to determine the first road segment to be included in the target coverage region, the topology processor 204 may estimate the number of vehicles that are accommodatable by the first regionalized server 107 based on the resource amount of the first regionalized server 107 (e.g., the total resource amount) and the operation requirements of the vehicle application (e.g., the required resource amount to execute an application request). The topology processor 204 may also determine the vehicle density of the road segment that includes the first coverage region of the first regionalized server 107 based on the traffic data of the road segment. In some embodiments, the topology processor 204 may then determine the first road segment from the road segment based on the number of vehicles that are accommodatable by the first regionalized server 107 and the vehicle density of the road segment, and determine the target coverage region for the first regionalized server 107 to include the first road segment. As an example, the topology processor 204 may determine that the first regionalized server 107 can accommodate 4500 vehicles, and the vehicle density of the road segment that includes the first coverage region of the first regionalized server 107 is 150 vehicles/km. In this example, the topology processor 204 may determine from the road segment the first road segment that has the length of 30 km to be included in the target coverage region of the first regionalized server 107.

In some embodiments, as the first road segment to be covered by the target coverage region of the first regionalized server 107 is determined, the topology processor 204 may determine the region shape of the target coverage region. In some embodiments, the target coverage region for the first regionalized server 107 may have the same region shape as the first coverage region of the first regionalized server 107 or a default region shape (e.g., ellipse). In some embodiments, the topology processor 204 may determine the region shape of the target coverage region based on the roadway structure of the first road segment included in the target coverage region (e.g., including both freeway section and ramp section), etc.

Figure 7D:
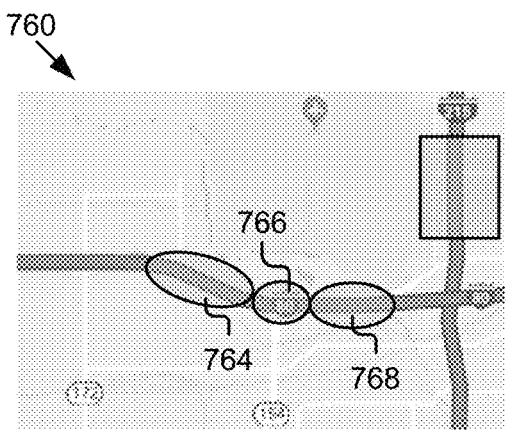
Figure 7D:
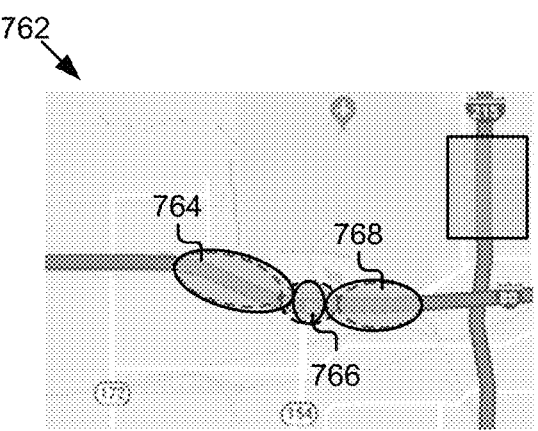

In some embodiments, the topology processor 204 may compare the target coverage region of the first regionalized server 107 and the first coverage region of the first regionalized server 107. If the target coverage region of the first regionalized server 107 is smaller than the first coverage region of the first regionalized server 107, the topology processor 204 may determine the topology modification of the geographical area to be the reduction of the first coverage region associated with the first regionalized server 107 to the target coverage region. As an example, FIG. 7D depicts a topology modification from the coverage region topology 760 to the coverage region topology 762, in which the coverage region 766 associated with the first regionalized server 107 is reduced to the target coverage region. If the target coverage region of the first regionalized server 107 is larger than the first coverage region of the first regionalized server 107, the topology processor 204 may determine the topology modification of the geographical area to be the expansion of the first coverage region associated with the first regionalized server 107 to the target coverage region. As an example, FIG. 7B depicts a topology modification from the coverage region topology 720 to the coverage region topology 722, in which the coverage region 726 associated with the first regionalized server 107 is expanded to the target coverage region.

In some embodiments, the topology processor 204 may determine that the target coverage region of the first regionalized server 107 is larger than the first coverage region of the first regionalized server 107 (e.g., to cover the first road segment that has the vehicle density satisfying the vehicle density threshold), and also determine that the resource amount of the first regionalized server 107 (e.g., the total resource amount) does not satisfy the required resource amount to accommodate the vehicle platforms 103 located within the target coverage region of the first regionalized server 107. In some embodiments, the topology processor 204 may then remove (e.g., inactivate) the first regionalized server 107, and initiate a replacement regionalized server 107 to replace the first regionalized server 107. In some embodiments, the replacement regionalized server 107 may cover the target coverage region, and may be allocated the resource amount that satisfies the required resource amount to accommodate the vehicle platforms 103 located within the target coverage region. As the first regionalized server 107 is removed, the replacement regionalized server 107 may now be considered as the first regionalized server 107. Thus, in this situation, the topology modification of the geographical area may be the creation of the target coverage region associated with the first regionalized server 107 as the first regionalized server 107 is initiated.

In some embodiments, the topology processor 204 may determine that the road segment associated with the traffic trigger event is not covered by any coverage region of the regionalized servers 107 in the geographical area. The topology processor 204 may then initiate a first regionalized server 107 (e.g., a virtual regionalized server 107). In some embodiments, the topology processor 204 may determine the target coverage region of the first regionalized server 107 to include the road segment associated with the traffic trigger event. The topology processor 204 may also allocate to the first regionalized server 107 the resource amount that satisfies the required resource amount to accommodate the vehicle platforms 103 located on this road segment. Thus, in this situation, the topology modification of the geographical area may be the creation of the target coverage region associated with the first regionalized server 107 as the first regionalized server 107 is initiated.

In some embodiments, if the event detector 202 detects the traffic trigger event in which the traffic pattern indicates a low traffic condition in a coverage area of a regionalized server 107 during a time window, the topology processor 204 may determine this regionalized server 107 to be the first regionalized server 107, the first regionalized server 107 may be associated with the first coverage region. In some embodiments, the topology processor 204 may inactivate the first regionalized server 107 during the time window due to the low traffic condition in the first coverage region. As the first regionalized server 107 is no longer available, the topology processor 204 may determine the target coverage region for the first regionalized server 107 to be zero. Thus, in this situation, the topology modification of the geographical area may be the elimination of the first coverage region associated with the first regionalized server 107 as the first regionalized server 107 is removed. Other implementations for determining the topology modification of the geographical area are also possible and contemplated.

In some embodiments, as the topology modification reflecting the target coverage region of the first regionalized server 107 is determined, the topology processor 204 may modify the coverage region topology of the geographical area based on the topology modification. In some embodiments, if the first regionalized server 107 is initiated, the topology processor 204 may create the target coverage region in the coverage region topology of geographical area and associate the first regionalized server 107 to the target coverage region. In some embodiments, if the first regionalized server 107 associated with the first coverage region is removed, the topology processor 204 may eliminate the first coverage region of the first regionalized server 107 from the coverage region topology of the geographical area. In some embodiments, if the first coverage region of the first regionalized server 107 is expanded or reduced to the target coverage region of the first regionalized server 107, the topology processor 204 may morph the first coverage region of the first regionalized server 107 into the target coverage region of the first regionalized server 107 in the coverage region topology of the geographical area.

In block 306, the coverage region manager 206 may determine a set of second coverage regions in the geographical area that are adjacent to the target coverage region of the first regionalized server 107. In some embodiments, the distance between the second coverage region in the set of second coverage regions and the target coverage region of the first regionalized server 107 may satisfy a distance threshold (e.g., less than 30 km). In some embodiments, the set of second coverage regions may be respectively associated with a set of second regionalized servers 107, each second regionalized server 107 in the set of second regionalized servers 107 may communicate with the vehicular traffic in its corresponding coverage region in the set of second coverage regions. For example, the second regionalized server 107 may send and receive data to and from the vehicle platforms 103 located within its coverage region, and provide the vehicle applications implemented on the second regionalized server 107 to these vehicle platforms 103.

In some embodiments, to determine the set of second coverage regions, if the topology modification of the geographical area is the creation of the target coverage region associated with the first regionalized server 107 as the first regionalized server 107 is newly initiated, or the expansion of the first coverage region associated with the first regionalized server 107 to the target coverage region of the first regionalized server 107, the coverage region manager 206 may determine the set of second coverage regions in which the second coverage region overlaps with the target coverage region of the first regionalized server 107. In the example depicted in FIG. 7A in which the coverage region 704 is created, the coverage region manager 206 may determine the set of second coverage regions to be the coverage regions 704 and 706. In the example depicted in FIG. 7B in which the coverage region 704 is expanded, the coverage region manager 206 may determine the set of second coverage regions to be the coverage regions 724 and 728.

In some embodiments, to determine the set of second coverage regions, if the topology modification of the geographical area is the elimination of the first coverage region associated with the first regionalized server 107 as the first regionalized server 107 is removed, or the reduction of the first coverage region associated with the first regionalized server 107 to the target coverage region of the first regionalized server 107, the coverage region manager 206 may determine the difference region between the first coverage region of the first regionalized server 107 and the target coverage region of the first regionalized server 107.

In some embodiments, the coverage region manager 206 may determine the set of second coverage regions that are adjacent to the target coverage region of the first regionalized server 107, in which the set of second regionalized servers 107 associated with the set of second coverage regions may have the resource amount (e.g., the total resource amount of the set of second regionalized servers 107) satisfying the required resource amount to accommodate 1) the vehicle platforms 103 located within the set of second coverage regions, and 2) the vehicle platforms 103 located within the difference region. In some embodiments, to determine the required resource amount to accommodate the vehicle platforms 103 located within these coverage regions, the coverage region manager 206 may estimate a number of vehicle platforms 103 located within these coverage regions based on the traffic condition of the road segments in these coverage regions (e.g., the vehicle density, the traffic flow rate, etc.). The coverage region manager 206 may then determine the required resource amount based on the number of vehicle platforms 103 located within these coverage regions and the operation requirement of the vehicle application (e.g., the amount of computational resources required to execute an application request). Continuing the example depicted in FIG. 7C in which the coverage region 746 is removed, the coverage region manager 206 may determine the set of second coverage regions to be the coverage regions 744 and 748. In the example depicted in FIG. 7D in which the coverage region 766 is reduced, the coverage region manager 206 may determine the set of second coverage regions to be the coverage regions 764 and 768.

Figure 7E:
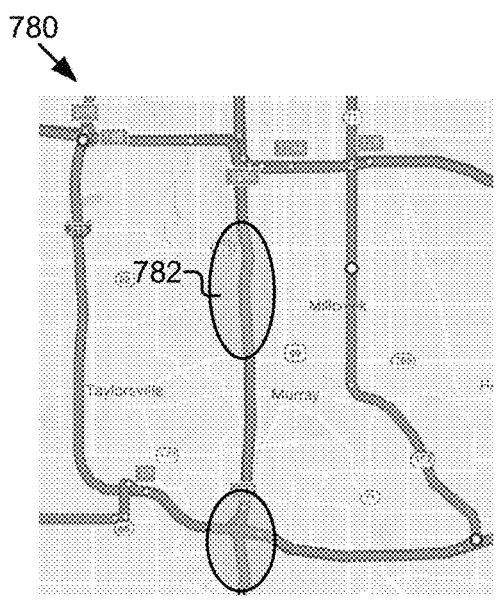
Figure 7E:
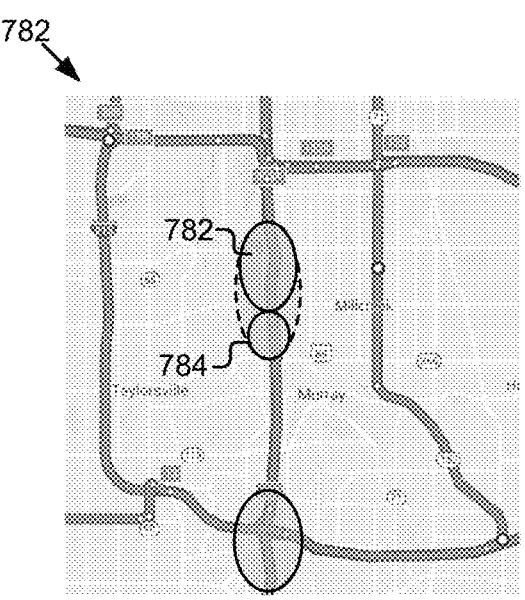

In some embodiments, the set of second coverage regions that are adjacent to the target coverage region of the first regionalized server 107 and have sufficient resource amount to also accommodate the vehicle platforms 103 in the difference region may not exist. If the set of second coverage regions does not exist, the coverage region manager 206 may initiate a third regionalized server 107 (e.g., a virtual regionalized server 107). In some embodiments, the coverage region manager 206 may allocate to the third regionalized server 107 the resource amount that satisfies the required resource amount to accommodate the vehicle platforms 103 located within the difference region, and assign the third regionalized server 107 to the difference region. Thus, in this case, the difference region caused by the elimination or the reduction of the first coverage region to the target coverage region of the first regionalized server 107 may be covered by the third regionalized server 107 that is newly initiated, without adjusting the second coverage regions adjacent to the target coverage region of the first regionalized server 107 (if any). As an example, FIG. 7E depicts a topology modification from the coverage region topology 780 to the coverage region topology 782, in which the coverage region 762 associated with the first regionalized server 107 is reduced to the target coverage region. In this example, the coverage region manager 206 may initiate an additional regionalized server 107 to cover the difference region 784.

In block 308, as the set of second coverage regions associated with the set of second regionalized servers 107 that are adjacent to the target coverage region of the first regionalized server 107 is determined, the coverage region manager 206 may determine a region count indicating the number of coverage regions included in the set of second coverage regions, and determine whether the region count of the set of second coverage regions satisfies a region count threshold (e.g., less than 2 coverage regions). If the region count of the set of second coverage regions satisfies the region count threshold, the coverage region manager 206 may determine that the topology modification that results in the target coverage region of the first regionalized server 107 only impacts a limited number of second coverage regions, and thus the coverage region manager 206 may perform a minor topology update to adjust the set of second coverage regions. To perform the minor topology update, in block 310, the coverage region manager 206 may determine a morphing portion for each second coverage region in the set of second coverage regions based on the target coverage region of the first regionalized server 107. In block 312, the coverage region manager 206 may morph the set of second coverage regions based on their corresponding morphing portions.

In some embodiments, the coverage region manager 206 may rely on the topology modification of the geographical area to perform the minor topology update. As discussed elsewhere herein, if the topology modification of the geographical area is the creation of the target coverage region associated with the first regionalized server 107 as the first regionalized server 107 is newly initiated, or the expansion of the first coverage region associated with the first regionalized server 107 to the target coverage region of the first regionalized server 107, the set of second coverage regions may include the second coverage regions that overlap with the target coverage region of the first regionalized server 107. In some embodiments, for these types of topology modification, the coverage region manager 206 may determine the morphing portion for each second coverage region in the set of second coverage regions to include an overlap area where the second coverage region associated with the second regionalized server 107 overlaps with the target coverage region of the first regionalized server 107. In some embodiments, the coverage region manager 206 may determine the morphing portion for the second coverage region to be the overlap area. The coverage region manager 206 may then morph the set of second coverage regions based on their corresponding morphing portions.

Figure 4A:
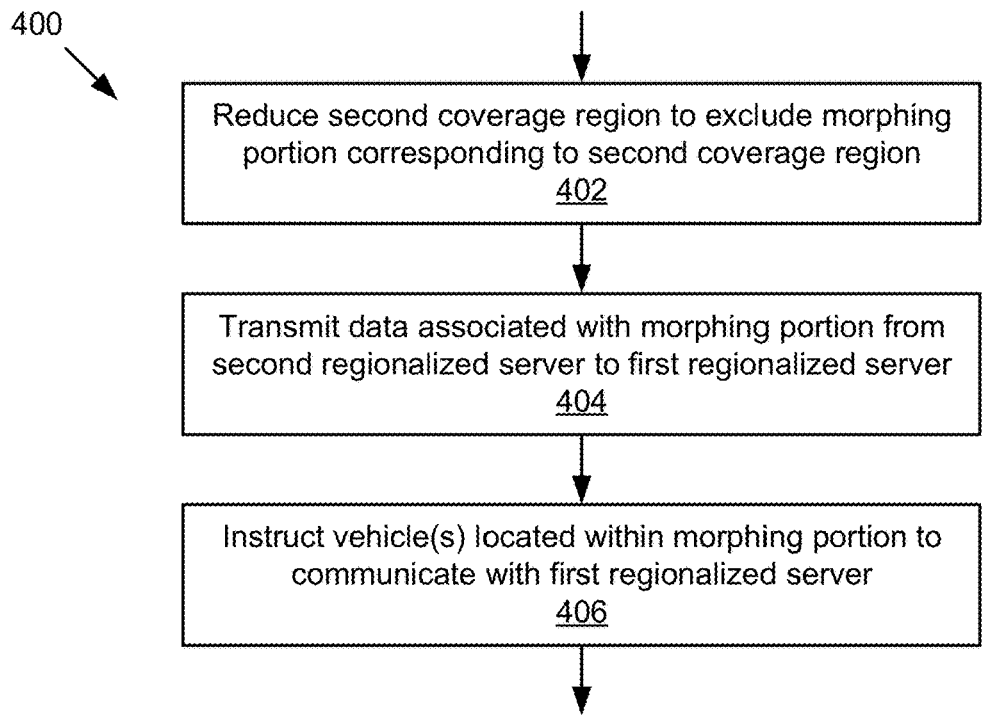
FIGS. 4A and 4B illustrate flowcharts of example methods for morphing the coverage region of the regionalized server.

FIG. 4A is a flowchart of an example method 400 for morphing the coverage region of the regionalized server 107. In some embodiments, the coverage region manager 206 may perform the method 400 to morph the set of second coverage regions if the topology modification of the geographical area is the creation of the target coverage region associated with the first regionalized server 107 as the first regionalized server 107 is newly initiated, or the expansion of the first coverage region associated with the first regionalized server 107 to the target coverage region of the first regionalized server 107. In some embodiments, for each second coverage region in the set of second coverage regions that is associated with a second regionalized server 107 in the set of second regionalized servers 107, in block 402, the coverage region manager 206 may reduce the second coverage region associated with the second regionalized server 107 to exclude the morphing portion corresponding to the second coverage region. As discussed above, the morphing portion of the second coverage region may be the overlap area between the second coverage region of the second coverage region 107 and the target coverage region of the first regionalized server 107.

In block 404, the coverage region manager 206 may retrieve the data associated with the morphing portion of the second coverage region from the second regionalized server 107 associated with the second coverage region and/or the management server 101, and transmit the data associated with the morphing portion of the second coverage region to the first regionalized server 107. In some embodiments, the data associated with the morphing portion may include the application data of the vehicle applications, the data associated with the vehicle platforms 103 located within the morphing portion, and/or other types of data that is necessary to communicate and provide the vehicle applications to the vehicle platforms 103 located within the morphing portion. In some embodiments, the second regionalized server 107 may continue to communicate and provide the vehicle applications to the vehicle platforms 103 located within the morphing portion during the minor topology update. As the data associated with the morphing portion is transmitted to the first regionalized server 107, the first regionalized server 107 may begin to cover the morphing portion. In block 406, the coverage region manager 206 may instruct the vehicle platforms 103 located within the morphing portion to communicate with the first regionalized server 107, and the first regionalized server 107 may provide the vehicle applications to these vehicle platforms 103.

As discussed above, the coverage region manager 206 may rely on the topology modification of the geographical area to perform the minor topology update. As discussed elsewhere herein, if the topology modification of the geographical area is the elimination of the first coverage region associated with the first regionalized server 107 as the first regionalized server 107 is removed, or the reduction of the first coverage region associated with the first regionalized server 107 to the target coverage region of the first regionalized server 107, the set of second coverage regions may include the second coverage regions that are adjacent to the target coverage region of the first regionalized server 107, in which the set of second regionalized servers 107 associated with the set of second coverage regions may have sufficient resource amount to accommodate 1) the vehicle platforms 103 located within the set of second coverage regions and 2) the vehicle platforms 103 located within the difference region. In some embodiments, for these types of topology modification, the coverage region manager 206 may determine the morphing portion for each second coverage region from the difference region between the first coverage region the first regionalized server 107 and the target coverage region of the first regionalized server 107.

In some embodiments, to determine the morphing portion for each second coverage region in the set of second coverage regions that is associated with a second regionalized server 107 in the set of second regionalized servers 107, the coverage region manager 206 may estimate the number of vehicles that the second regionalized server 107 can additionally accommodate based on the resource amount of the second regionalized server 107 (e.g., the available resource amount), and the operation requirement of the vehicle application (e.g., the amount of various computational resources required to execute an application request). The coverage region manager 206 may then determine a portion of the difference region that the second regionalized server 107 can cover based on the number of vehicles that the second regionalized server 107 can additionally accommodate, and the traffic condition of various road segments in the difference region (e.g., the vehicle density, the traffic flow rate, etc.). The coverage region manager 206 may then determine this portion of the difference region to be the morphing portion for the second coverage region associated with the second regionalized server 107. As an example, the coverage region manager 206 may determine that second regionalized server 107 can additionally accommodate 1800 vehicles, and the vehicle density of the road segments in the difference region is 90 vehicles/km. In this example, the coverage region manager 206 may determine a portion of the difference region that includes the road segments with the length of 20 km to be the morphing portion for the second coverage region associated with the second regionalized server 107.

Figure 4B:
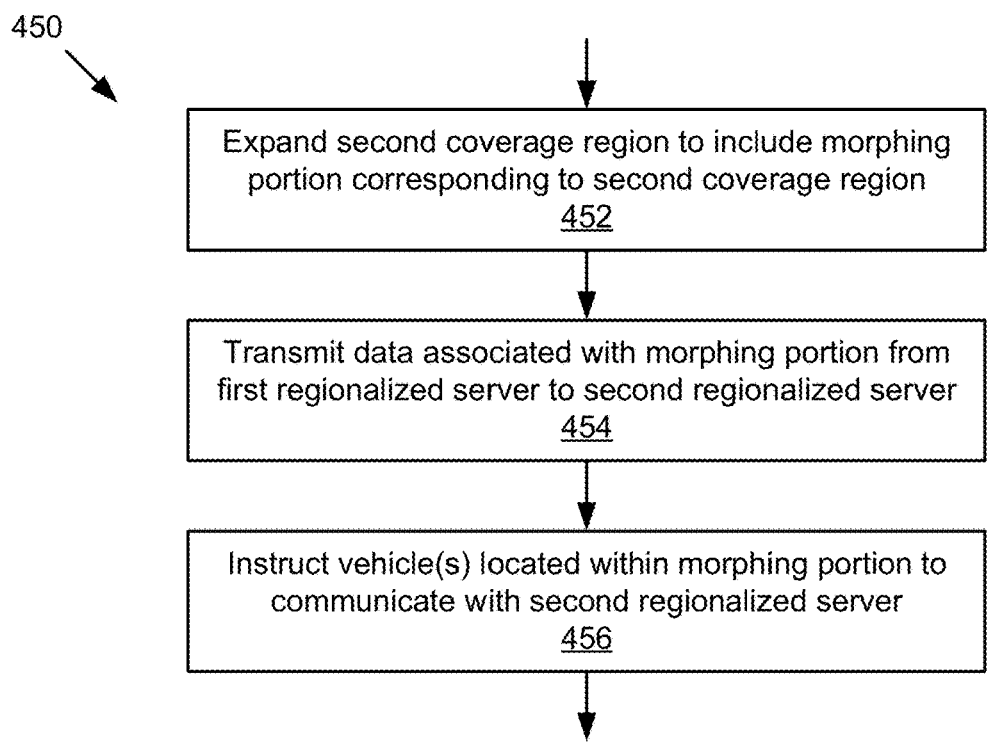

FIG. 4B is a flowchart of an example method 450 for morphing the coverage region of the regionalized server 107. In some embodiments, the coverage region manager 206 may perform the method 450 to morph the set of second coverage regions if the topology modification of the geographical area is the elimination of the first coverage region associated with the first regionalized server 107 as the first regionalized server 107 is removed, or the reduction of the first coverage region associated with the first regionalized server 107 to the target coverage region of the first regionalized server 107. In some embodiments, for each second coverage region in the set of second coverage regions that is associated with a second regionalized server 107 in the set of second regionalized servers 107, in block 452, the coverage region manager 206 may expand the second coverage region associated with the second regionalized server 107 to include the morphing portion corresponding to the second coverage region. As discussed above, the morphing portion of the second coverage region may be the portion of the difference region between the first coverage region the first regionalized server 107 and the target coverage region of the first regionalized server 107 that the second regionalized servers 107 can cover.

In block 454, the coverage region manager 206 may retrieve the data associated with the morphing portion of the second coverage region from the first regionalized server 107 and/or the management server 101, and transmit the data associated with the morphing portion of the second coverage region to the second regionalized server 107 associated with the second coverage region. As discussed elsewhere herein, the data associated with the morphing portion may include the application data of the vehicle applications, the data associated with the vehicle platforms 103 located within the morphing portion, and/or other types of data that is necessary to communicate and provide the vehicle applications to the vehicle platforms 103 located within the morphing portion. In some embodiments, the first regionalized server 107 and/or the management server 101 may continue to communicate and provide the vehicle applications to the vehicle platforms 103 located within the morphing portion during the minor topology update. As the data associated with the morphing portion is transmitted to the second regionalized server 107, the second regionalized server 107 may begin to cover the morphing portion. In block 456, the coverage region manager 206 may instruct the vehicle platforms 103 located within the morphing portion to communicate with the second regionalized server 107, and the second regionalized server 107 may provide the vehicle applications to these vehicle platforms 103.

In some embodiments, the coverage region manager 206 may update the coverage region topology of the geographical area to indicate the target coverage region covered by the first regionalized server 107 and the set of second coverage regions covered by the set of second regionalized servers 107 that are morphed based on the target coverage region. The coverage region manager 206 may then transmit the updated coverage region topology of the geographical area to the regionalized servers 107 associated with the coverage regions in the geographical area and the vehicle platforms 103. In some embodiments, the regionalized servers 107 and the vehicle platforms 103 may adjust the communication between the regionalized servers 107 and the vehicle platforms 103 based on the updated coverage region topology of the geographical area. In some embodiments, the regionalized server 107 may reference the updated coverage region topology of the geographical area to determine its coverage region, and communicate and provide the vehicle applications to the vehicle platforms 103 located within its coverage region. The coverage region of the regionalized server 107 may lie within the communication range of the regionalized server 107 but have different shape and/or size. In some embodiments, the vehicle platform 103 may reference the updated coverage region topology of the geographical area to determine the coverage region within which the vehicle platform 103 is located, and communicate with the regionalized server 107 associated with this coverage region. If the vehicle platform 103 is not located within any coverage regions associated with the regionalized servers 107 in the geographical area, the vehicle platform 103 may communicate with the management server 101.

Referring back to FIG. 3, if in block 308, the coverage region manager 206 determines that the number of coverage regions included in the set of second coverage regions does not satisfy the region count threshold (e.g., less than 2 coverage regions), the coverage region manager 206 may determine that the topology modification that results in the target coverage region of the first regionalized server 107 impacts a relatively large number of second coverage regions, and thus the coverage region manager 206 may perform a major topology update. To perform the major topology update, the coverage region manager 206 may determine a set of existing regionalized servers 107 from the first regionalized server 107 and the set of second regionalized servers 107. The set of existing regionalized servers 107 may include one or more regionalized server 107 among the first regionalized server 107 and the set of second regionalized servers 107 that exist prior to the topology modification of the geographical area. In some embodiments, if the topology modification of the geographical area is the creation of the target coverage region associated with the first regionalized server 107 as the first regionalized server 107 is newly initiated, the coverage region manager 206 may determine the set of existing regionalized servers 107 to include the set of second regionalized servers 107. In some embodiments, if the topology modification of the geographical area is the expansion of the first coverage region associated with the first regionalized server 107 to the target coverage region of the first regionalized server 107, the reduction of the first coverage region associated with the first regionalized server 107 to the target coverage region of the first regionalized server 107, or the elimination of the first coverage region associated with the first regionalized server 107 as the first regionalized server 107 is removed, the coverage region manager 206 may determine the set of existing regionalized servers 107 to include the first regionalized server 107 and the set of second regionalized servers 107.

In block 320, the coverage region manager 206 may determine a set of third regionalized servers 107 from the first regionalized server 107 and the set of second regionalized servers 107. The set of third regionalized servers 107 may include one or more regionalized servers 107 among the first regionalized server 107 and the set of second regionalized servers 107 that exist as a result of the topology modification. In some embodiments, the coverage region manager 206 may determine the set of third regionalized servers 107 based on the topology modification of the geographical area. In some embodiments, if the topology modification of the geographical area is the creation of the target coverage region associated with the first regionalized server 107 as the first regionalized server 107 is newly initiated, the expansion of the first coverage region associated with the first regionalized server 107 to the target coverage region of the first regionalized server 107, or the reduction of the first coverage region associated with the first regionalized server 107 to the target coverage region of the first regionalized server 107, the coverage region manager 206 may determine the set of third regionalized servers 107 to include the first regionalized server 107 and the set of second regionalized servers 107. In some embodiments, if the topology modification of the geographical area is the elimination of the first coverage region associated with the first regionalized server 107 as the first regionalized server 107 is removed, the coverage region manager 206 may determine the set of third regionalized servers 107 to include the set of second regionalized servers 107.

Figure 8A:
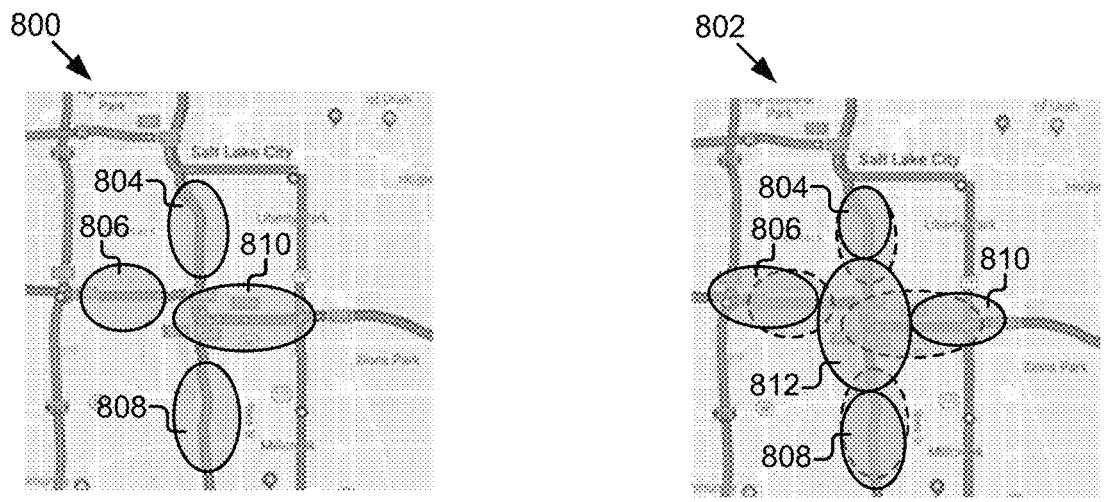
FIGS. 8A-8C illustrate examples of the coverage regions associated with the regionalized servers being re-established.
Figure 8B:
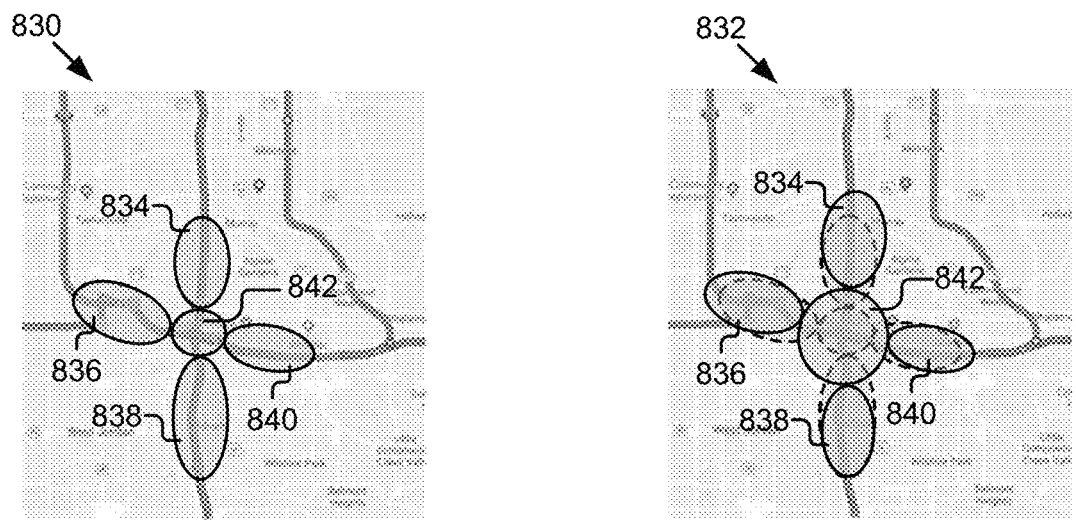
Figure 8C:
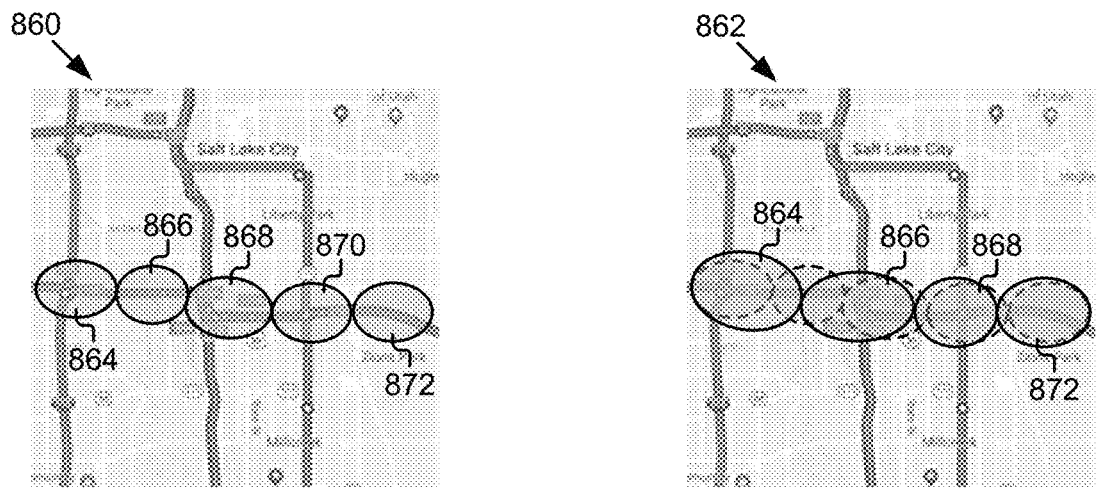

As an example, FIG. 8A depicts a topology modification from the coverage region topology 800 to the coverage region topology 802, in which the coverage region 812 associated with the first regionalized server 107 is created as the first regionalized server 107 is newly initiated. In this example, the set of existing regionalized servers 107 may include the set of second regionalized servers 107 associated with the coverage region 804, 806, 808, 810, and the set of third regionalized servers 107 may include the first regionalized server 107 and the set of second regionalized servers 107. FIG. 8B depicts a topology modification from the coverage region topology 830 to the coverage region topology 832, in which the coverage region 842 associated with the first regionalized server 107 is expanded to the target coverage region. In this example, the set of existing regionalized servers 107 and the set of third regionalized servers 107 may both include the first regionalized server 107 associated with the coverage region 842 and the set of second regionalized servers 107 associated with the coverage region 834, 836, 838, 840. FIG. 8C depicts a topology modification from the coverage region topology 860 to the coverage region topology 862, in which the coverage region 870 associated with the first regionalized server 107 is eliminated as the first regionalized server 107 is removed. In this example, the set of existing regionalized servers 107 may include the first regionalized server 107 associated with the coverage region 870 and the set of second regionalized servers 107 associated with the coverage region 868, 866, 868, 872, and the set of third regionalized servers 107 may include the set of second regionalized servers 107.

In block 322, the coverage region manager 206 may determine a set of third coverage regions in the geographical area for the set of third regionalized servers 107. In some embodiments, if the set of third regionalized servers 107 includes the first regionalized server 107, the coverage region manager 206 may determine the third coverage region for the first regionalized server 107 to be the target coverage region of the first regionalized server 107. As discussed above, the set of third regionalized servers 107 may include the set of second regionalized servers 107. In some embodiments, the coverage region manager 206 may determine the third coverage region for each second regionalized server 107 in a manner similar to determining the target coverage region for the first regionalized server 107 as discussed in details with reference to block 304 of FIG. 3.

Thus, as discussed in details with reference to block 304 of FIG. 3, the coverage region manager 206 may determine the third coverage region for the third regionalized server 107 in the set of third regionalized servers 107 (e.g., the first regionalized server 107 (if included) and the second regionalized servers 107) based on the resource amount of the third regionalized server 107, the operation requirement of the vehicle application implemented on the third regionalized server 107, the traffic condition of the road segments in the third coverage region, etc. For example, the coverage region manager 206 may determine the third coverage region for the third regionalized server 107 to include the road segment that has the vehicle density of the road segment satisfying the vehicle density threshold, the road segment that the third regionalized server 107 has sufficient resource amount to accommodate the vehicle platforms 103 located on the road segment, the road segment where a vehicle application implemented on the third regionalized server 107 is temporarily accessible to the vehicle platforms 103 located on the road segment, etc. In block 324, the coverage region manager 206 may respectively assign the set of third coverage regions to the set of third regionalized servers 107.

Figure 5:
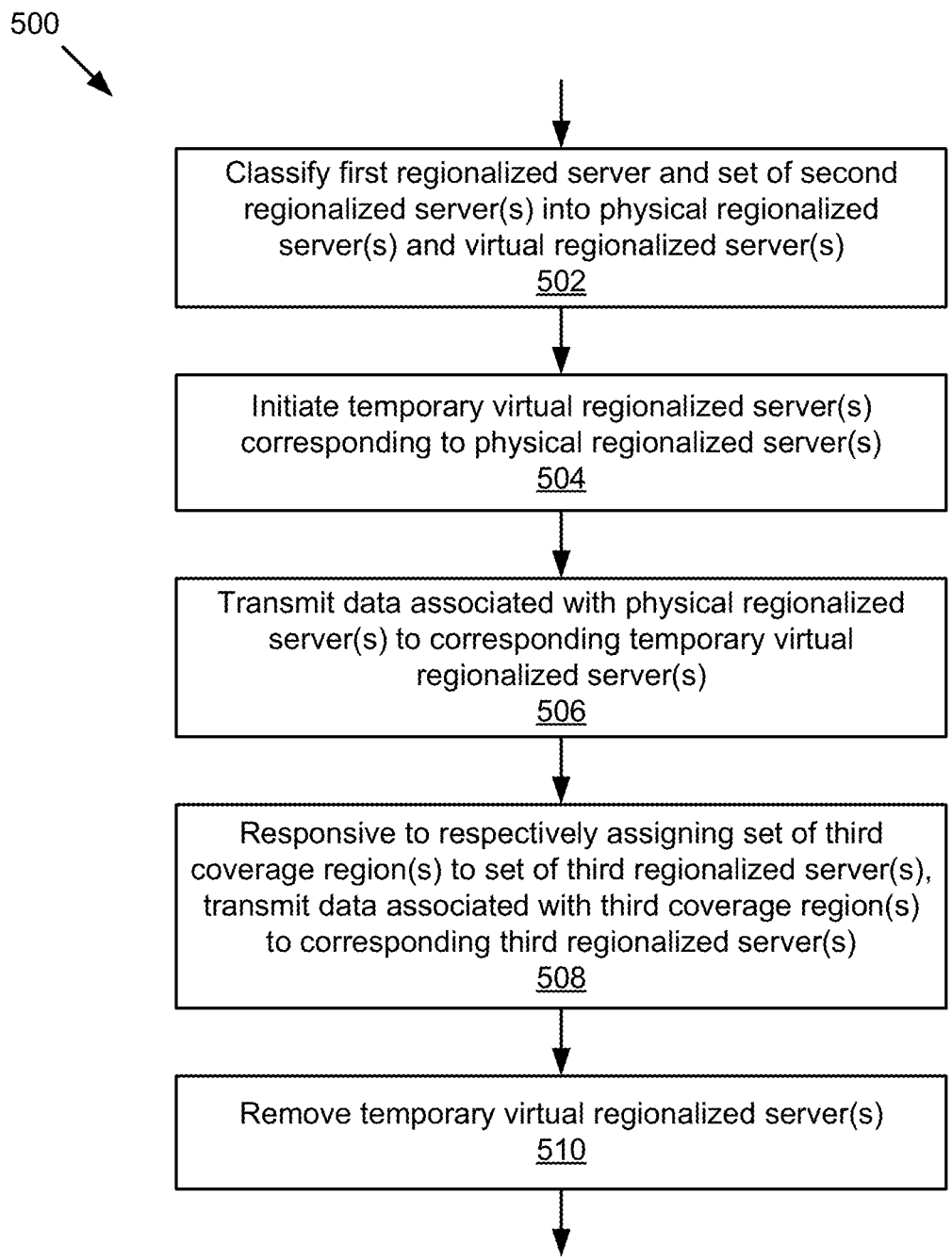
FIG. 5 is a flowchart of an example method for re-establishing the coverage regions of the regionalized servers.

In some embodiments, as the set of third coverage regions is determined and respectively assigned to the set of third regionalized servers 107, the coverage region manager 206 may re-establish the coverage regions associated with the set of existing regionalized servers 107 to form the set of third coverage regions associated with the set of third regionalized servers 107. FIG. 5 is a flowchart of an example method 500 for re-establishing the coverage regions of the regionalized servers 107. In block 502, the coverage region manager 206 may classify the set of existing regionalized servers 107 into one or more physical regionalized servers 107 and one or more virtual regionalized servers 107. As discussed above, the set of existing regionalized servers 107 may include the set of second regionalized servers 107 and/or the first regionalized server 107.

In block 504, for each physical regionalized server 107, the coverage region manager 206 may initiate a temporary virtual regionalized server 107 corresponding to the physical regionalized server 107. The temporary virtual regionalized server 107 may reside at the management server 101. In block 506, the coverage region manager 206 may transmit the data associated with each physical regionalized server 107 to the temporary virtual regionalized server 107 corresponding to the physical regionalized server 107. In some embodiments, the data associated with each physical regionalized server 107 may include the application data of the vehicle applications, the data associated with the vehicle platforms 103 located within the coverage region of the physical regionalized server 107, and/or other types of data that is necessary to communicate and provide the vehicle applications to the vehicle platforms 103 located within the coverage region of the physical regionalized server 107. In some embodiments, the coverage region manager 206 may also implement on the temporary virtual regionalized server 107 the vehicle applications implemented on the corresponding the physical regionalized server 107.

In some embodiments, during the major topology update, the physical regionalized server 107 may continue to receive data from the vehicle platforms 103 located within its coverage region, and relay this data to the corresponding temporary virtual regionalized server 107. Thus, the temporary virtual regionalized server 107 may execute application requests and provide the vehicle applications to the vehicle platforms 103 located within the coverage region of the physical regionalized server 107 during the major topology update. During the major topology update, the virtual regionalized server 107 may also continue to receive data and provide the vehicle applications to the vehicle platforms 103 located within its coverage region. This implementation is advantageous because it avoids interrupting the operation of the vehicle applications provided by the set of existing regionalized servers 107 to the vehicle platforms 103 located within their coverage regions.

In block 508, responsive to respectively assigning the set of third coverage regions to the set of third regionalized servers 107, the coverage region manager 206 may retrieve the data associated with each third coverage region from the virtual regionalized server 107 and/or the temporary virtual regionalized server 107 corresponding to the physical regionalized server 107, and transmit the data associated with each third coverage region to the third regionalized server 107 associated with the third coverage region. In some embodiments, the data associated with the third coverage region may include the application data of the vehicle applications, the data associated with the vehicle platforms 103 located within the third coverage region, and/or other types of data that is necessary to communicate and provide the vehicle applications to the vehicle platforms 103 located within the third coverage region. The data associated with each third coverage region may be retrieved from the virtual regionalized servers 107 and/or the temporary virtual regionalized servers 107 that covered at least a portion of the third coverage region during the major topology update.

In some embodiments, as the data associated with each third coverage region is transmitted to the third regionalized server 107 associated with the third coverage region, the third regionalized server 107 may begin to cover the third coverage region. Thus, the coverage region manager 206 may instruct the vehicle platforms 103 located within the third coverage region to communicate with the third regionalized server 107, and the third regionalized server 107 may provide the vehicle applications to these vehicle platforms 103. In block 510, as the data associated with the third coverage regions is transmitted to the corresponding third regionalized server 107, the coverage region manager 206 may remove the temporary virtual regionalized servers 107.

In some embodiments, the coverage region manager 206 may update the coverage region topology of the geographical area to indicate the set of third coverage regions associated with the set of third regionalized servers 107 that replaces the coverage regions associated with the set of existing regionalized servers 107. The coverage region manager 206 may then transmit the updated coverage region topology of the geographical area to the regionalized servers 107 associated with the coverage regions in the geographical area and the vehicle platforms 103. As discussed elsewhere herein, the regionalized servers 107 and the vehicle platforms 103 may adjust the communication between the regionalized servers 107 and the vehicle platforms 103 based on the updated coverage region topology of the geographical area. For example, the regionalized servers 107 may reference the updated coverage region topology of the geographical area to determine its coverage region, and communicate and provide the vehicle applications to the vehicle platforms 103 located within its coverage region. The vehicle platform 103 may reference the updated coverage region topology of the geographical area to determine the coverage region within which the vehicle platform 103 is located, and communicate with the regionalized server 107 associated with this coverage region.

Thus, as a result of the topology modification and the minor topology update or the major topology update, the first coverage region associated with the first regionalized server 107 can be flexibly modified (e.g., created, eliminated, expanded, or reduced) into the target coverage region of the first regionalized server 107, and the set of second coverage regions associated with the set of second regionalized servers 107 that are adjacent to the target coverage region of the first regionalized server 107 can be morphed or re-established according to the target coverage region of the first regionalized server 107. As the coverage regions of the regionalized servers 107 can be dynamically adjusted or redefined, the regionalized server 107 may have sufficient computational resources to provide vehicle applications to the vehicle platforms 103 located within its coverage region. The regionalized server 107 can also collect relevant data from multiple vehicle platforms 103 located within its coverage region, and thus the operation of the vehicle applications implemented on the regionalized server 107 (e.g., the navigation application 122) can be improved. The regionalized server 107 can also temporarily cover a particular coverage region in the geographical area to dynamically provide a vehicle application to the vehicle platforms 103 located within that coverage region on a temporary basis.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    determining a topology modification for a geographical area;
    determining a set of one or more coverage regions in the geographical area that are adjacent to a target coverage region, the target coverage region being associated with a first regionalized server configured to communicate with vehicular traffic in the target coverage region, the set of one or more coverage regions being respectively associated with a set of one or more second regionalized servers, each second regionalized server of the set of one or more second regionalized servers being configured to communicate with vehicular traffic in a corresponding coverage region of the set of one or more coverage regions;
    determining that a region count of the set of one or more coverage regions satisfies a region count threshold;
    responsive to determining that the region count of the set of one or more coverage regions satisfies the region count threshold, determining a morphing portion for each coverage region in the set of one or more coverage regions; and
    morphing the set of one or more coverage regions associated with the set of one or more second regionalized servers based on corresponding morphing portions.

2. The method of claim 1, wherein:
    the topology modification of the geographical area includes one of
        a creation of the target coverage region for the first regionalized server, the first regionalized server being initiated; and
        an expansion of a first coverage region associated with the first regionalized server to the target coverage region; and
    determining the morphing portion of a coverage region of the set of one or more coverage regions to include an area where the coverage region associated with a second regionalized server overlaps with the target coverage region of the first regionalized server.

3. The method of claim 2, wherein morphing the set of one or more coverage regions associated with the set of one or more second regionalized servers includes:
    reducing the coverage region associated with the second regionalized server to exclude the morphing portion corresponding to the coverage region;
    transmitting data associated with the morphing portion from the second regionalized server to the first regionalized server; and
    instructing a plurality of vehicles located within the morphing portion to communicate with the first regionalized server.

4. The method of claim 1, wherein:
    the topology modification of the geographical area includes one of:
        an elimination of a first coverage region associated with the first regionalized server, the first regionalized server being removed; and
        a reduction of the first coverage region associated with the first regionalized server to the target coverage region; and
    determining the set of one or more coverage regions in the geographical area includes:
        determining a difference region between the first coverage region associated with the first regionalized server and the target coverage region; and
        determining that a resource amount of the set of one or more second regionalized servers satisfies a resource amount to accommodate a plurality of vehicles located within the set of one or more coverage regions associated with the set of one or more second regionalized servers and the difference region.

5. The method of claim 4, wherein determining the morphing portion for each coverage region in the set of one or more coverage regions includes:
    determining, from the difference region, a morphing portion for a coverage region associated with a second regionalized server based on a resource amount of the second regionalized server and a traffic condition in the difference region.

6. The method of claim 5, wherein morphing the set of one or more coverage regions associated with the set of one or more second regionalized servers includes:
    expanding the coverage region associated with the second regionalized server to include the morphing portion corresponding to the coverage region;
    transmitting data associated with the morphing portion from the first regionalized server to the second regionalized server; and
    instructing a plurality of vehicles located within the morphing portion to communicate with the second regionalized server.

7. The method of claim 1, further comprising:
    determining that the region count of the set of one or more coverage regions does not satisfy the region count threshold;
    responsive to determining that the region count of the set of one or more coverage regions does not satisfy the region count threshold, determining, from the first regionalized server and the set of one or more second regionalized servers, a set of one or more third regionalized servers based on the topology modification of the geographical area;

determining a set of one or more third coverage regions in the geographical area for the set of one or more third regionalized servers; and respectively assigning the set of one or more third coverage regions to the set of one or more third regionalized servers.

8. The method of claim 7, wherein determining the set of one or more third coverage regions in the geographical area includes:

determining a third coverage region for a third regionalized server based on a resource amount of the third regionalized server and a traffic condition in the third coverage region.

9. The method of claim 7, further comprising:

classifying the first regionalized server and the set of one or more second regionalized servers into one or more physical regionalized servers and one or more virtual regionalized servers;

initiating one or more temporary virtual regionalized servers corresponding to the one or more physical regionalized servers;

transmitting data associated with each physical regionalized server to a temporary virtual regionalized server corresponding to the physical regionalized server; and responsive to respectively assigning the set of one or more third coverage regions to the set of one or more third regionalized servers, transmitting, from the one or more virtual regionalized servers and the one or more temporary virtual regionalized servers, data associated with each third coverage region to a third regionalized server associated with the third coverage region.

10. The method of claim 9, further comprising:

responsive to transmitting the data associated with each third coverage region to the third regionalized server associated with the third coverage region, instructing a plurality of vehicles located within the third coverage region associated with the third regionalized server to communicate with the third regionalized server; and removing the one or more temporary virtual regionalized servers.

11. The method of claim 1, wherein the topology modification of the geographical area is associated with a trigger event, the trigger event including one or more of:

a change of roadway condition, a change of traffic condition, and a change of traffic condition reflected in a traffic pattern of a road segment in the geographical area;

an implementation of a vehicle application that is temporarily accessible in an application accessible area within the geographical area; and an unavailability of a regionalized server associated with a coverage region in the geographical area.

12. The method of claim 1, wherein determining the topology modification for the geographical area includes:

determining a road segment in the geographical area that has a vehicle density of the road segment satisfying a vehicle density threshold; and determining the target coverage region for the first regionalized server based on the road segment.

13. The method of claim 1, wherein determining the topology modification for the geographical area includes:

determining an application accessible area for a vehicle application temporarily implemented on the first regionalized server; and determining the target coverage region for the first regionalized server based on the application accessible area of the vehicle application.

14. The method of claim 1, wherein determining the topology modification for the geographical area includes:

estimating a number of vehicles that are accommodatable by the first regionalized server based on a resource amount of the first regionalized server and operation requirements of a vehicle application;

determining a vehicle density of a road segment that includes a first coverage region associated with the first regionalized server; and determining the target coverage region for the first regionalized server based on the number of vehicles that are accommodatable by the first regionalized server and the vehicle density of the road segment.

15. A system comprising:

one or more processors; and one or more memories storing instructions that, when executed by the one or more processors, cause the system to:

determine a topology modification for a geographical area;

determine a set of one or more coverage regions in the geographical area that are adjacent to a target coverage region, the target coverage region being associated with a first regionalized server configured to communicate with vehicular traffic in the target coverage region, the set of one or more coverage regions being respectively associated with a set of one or more second regionalized servers, each second regionalized server of the set of one or more second regionalized servers being configured to communicate with vehicular traffic in a corresponding coverage region of the set of one or more coverage regions;

determine that a region count of the set of one or more coverage regions satisfies a region count threshold;

responsive to determining that the region count of the set of one or more coverage regions satisfies the region count threshold, determine a morphing portion for each coverage region in the set of one or more coverage regions; and morph the set of one or more coverage regions associated with the set of one or more second regionalized servers based on corresponding morphing portions.

16. The system of claim 15, wherein:

the topology modification of the geographical area includes one of:

a creation of the target coverage region for the first regionalized server, the first regionalized server being initiated; and an expansion of a first coverage region associated with the first regionalized server to the target coverage region; and determining the morphing portion of a coverage region of the set of one or more coverage regions to include an area where the coverage region associated with a second regionalized server overlaps with the target coverage region of the first regionalized server.

17. The system of claim 16, wherein to morph the set of one or more coverage regions associated with the set of one or more second regionalized servers includes:

reducing the coverage region associated with the second regionalized server to exclude the morphing portion corresponding to the coverage region;

transmitting data associated with the morphing portion from the second regionalized server to the first regionalized server; and instructing a plurality of vehicles located within the morphing portion to communicate with the first regionalized server.

18. The system of claim 15, wherein:
the topology modification of the geographical area includes one of:
an elimination of a first coverage region associated with the first regionalized server, the first regionalized server being removed; and
a reduction of the first coverage region associated with the first regionalized server to the target coverage region; and
determining the set of one or more coverage regions in the geographical area includes:
determining a difference region between the first coverage region associated with the first regionalized server and the target coverage region; and
determining that a resource amount of the set of one or more second regionalized servers satisfies a resource amount to accommodate a plurality of vehicles located within the set of one or more coverage regions associated with the set of one or more second regionalized servers and the difference region.

19. The system of claim 18, wherein to determine the morphing portion for each coverage region in the set of one or more coverage regions includes:
determining, from the difference region, a morphing portion for a coverage region associated with a second regionalized server based on a resource amount of the second regionalized server and a traffic condition in the difference region.

20. The system of claim 19, wherein to morph the set of one or more coverage regions associated with the set of one or more second regionalized servers includes:
expanding the coverage region associated with the second regionalized server to include the morphing portion corresponding to the coverage region;
transmitting data associated with the morphing portion from the first regionalized server to the second regionalized server; and
instructing a plurality of vehicles located within the morphing portion to communicate with the second regionalized server.

21. The system of claim 15, wherein the instructions, when executed by the one or more processors, further cause the system to:
determine that the region count of the set of one or more coverage regions does not satisfy the region count threshold;
responsive to determining that the region count of the set of one or more coverage regions does not satisfy the region count threshold, determine, from the first regionalized server and the set of one or more second regionalized servers, a set of one or more third regionalized servers based on the topology modification of the geographical area;
determine a set of one or more third coverage regions in the geographical area for the set of one or more third regionalized servers; and
respectively assign the set of one or more third coverage regions to the set of one or more third regionalized servers.

22. The system of claim 21, wherein to determine the set of one or more third coverage regions in the geographical area includes:
determining a third coverage region for a third regionalized server based on a resource amount of the third regionalized server and a traffic condition in the third coverage region.

23. The system of claim 21, wherein the instructions, when executed by the one or more processors, further cause the system to:
classify the first regionalized server and the set of one or more second regionalized servers into one or more physical regionalized servers and one or more virtual regionalized servers;
initiate one or more temporary virtual regionalized servers corresponding to the one or more physical regionalized servers;
transmit data associated with each physical regionalized server to a temporary virtual regionalized server corresponding to the physical regionalized server; and
responsive to respectively assigning the set of one or more third coverage regions to the set of one or more third regionalized servers, transmit, from the one or more virtual regionalized servers and the one or more temporary virtual regionalized servers, data associated with each third coverage region to a third regionalized server associated with the third coverage region.

24. The system of claim 23, wherein the instructions, when executed by the one or more processors, further cause the system to:
responsive to transmitting the data associated with each third coverage region to the third regionalized server associated with the third coverage region, instruct a plurality of vehicles located within the third coverage region associated with the third regionalized server to communicate with the third regionalized server; and
remove the one or more temporary virtual regionalized servers.

25. The system of claim 15, wherein the topology modification of the geographical area is associated with a trigger event, the trigger event including one or more of:
a change of roadway condition, a change of traffic condition, and a change of traffic condition reflected in a traffic pattern of a road segment in the geographical area;
an implementation of a vehicle application that is temporarily accessible in an application accessible area within the geographical area; and
an unavailability of a regionalized server associated with a coverage region in the geographical area.

26. The system of claim 15, wherein to determine the topology modification for the geographical area includes:
determining a road segment in the geographical area that has a vehicle density of the road segment satisfying a vehicle density threshold; and
determining the target coverage region for the first regionalized server based on the road segment.

27. The system of claim 15, wherein to determine the topology modification for the geographical area includes:
determining an application accessible area for a vehicle application temporarily implemented on the first regionalized server; and
determining the target coverage region for the first regionalized server based on the application accessible area of the vehicle application.

28. The system of claim 15, wherein to determine the topology modification for the geographical area includes:
estimating a number of vehicles that are accommodatable by the first regionalized server based on a resource amount of the first regionalized server and operation requirements of a vehicle application;

determining a vehicle density of a road segment that includes a first coverage region associated with the first regionalized server; and determining the target coverage region for the first regionalized server based on the number of vehicles that are accommodatable by the first regionalized server and the vehicle density of the road segment.

29. A method comprising:

detecting a traffic trigger event associated with a geographical area, the geographical area including a set of one or more coverage regions that are respectively associated with a set of one or more regionalized servers;

determining a topology modification for the geographical area based on a traffic condition associated with the traffic trigger event; and modifying a coverage region topology of the geographical area based on the topology modification by one or more of:

creating an additional coverage region for the geographical area and associating the additional coverage region with an additional regionalized server; and morphing one or more coverage regions in the set of one or more coverage regions.

30. The method of claim 29, wherein:

the traffic trigger event includes one or more of a change of roadway condition, a change of traffic condition, and a change of traffic condition reflected in a traffic pattern of a road segment in the geographical area; and the traffic condition associated with the traffic trigger event includes one or more of a vehicle density, a traffic flow rate, an average vehicle speed, and an average following distance associated with the road segment.

31. The method of claim 29, wherein:

determining the topology modification for the geographical area includes determining a target coverage region in the geographical area for a first regionalized server based on the traffic condition associated with the traffic trigger event; and modifying the coverage region topology of the geographical area based on the topology modification includes modifying the coverage region topology by one or more of:

creating the target coverage region in the geographical area and associating the target coverage region with the first regionalized server, the first regionalized server being initiated;

morphing a first coverage region associated with the first regionalized server into the target coverage region; and eliminating the first coverage region associated with the first regionalized server, the first regionalized server being removed.

32. The method of claim 31, further comprising:

determining, from the set of one or more coverage regions associated with the set of one or more regionalized servers, a set of one or more second coverage regions that are adjacent to the target coverage region of the first regionalized server, the set of one or more second coverage regions being respectively associated with a set of one or more second regionalized servers; and morphing the set of one or more second coverage regions associated with the set of one or more second regionalized servers based on the target coverage region of the first regionalized server.

33. The method of claim 31, wherein determining the target coverage region in the geographical area for the first regionalized server based on the traffic condition associated with the traffic trigger event includes one or more of:

determining the target coverage region for the first regionalized server based on a road segment in the geographical area that has a vehicle density of the road segment satisfying a vehicle density threshold; and determining the target coverage region for the first regionalized server based on a number of vehicles that are accommodatable by the first regionalized server and a vehicle density of a road segment that includes the first coverage region associated with the first regionalized server.

* * * * *